United States Patent
Park

(10) Patent No.: US 9,176,661 B2
(45) Date of Patent: Nov. 3, 2015

(54) MOBILE TERMINAL AND CONTROLLING METHOD THEREOF

(75) Inventor: Kyungchul Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 261 days.

(21) Appl. No.: 13/412,445

(22) Filed: Mar. 5, 2012

(65) Prior Publication Data

US 2012/0240071 A1 Sep. 20, 2012

(30) Foreign Application Priority Data

Mar. 18, 2011 (KR) .................. 10-2011-0024306

(51) Int. Cl.
| | |
|---|---|
| G06F 3/048 | (2013.01) |
| G06F 3/0488 | (2013.01) |
| G06F 3/0482 | (2013.01) |
| G06F 3/0486 | (2013.01) |
| G06F 3/0481 | (2013.01) |
| G06F 3/0484 | (2013.01) |

(52) U.S. Cl.
CPC ............ *G06F 3/0488* (2013.01); *G06F 3/0482* (2013.01); *G06F 3/0486* (2013.01); *G06F 3/04817* (2013.01); *G06F 3/04845* (2013.01)

(58) Field of Classification Search
CPC  G06F 3/0486; G06F 3/04817; G06F 3/04845
USPC ........................................................ 715/769
See application file for complete search history.

(56) References Cited

U.S. PATENT DOCUMENTS

| | | | | |
|---|---|---|---|---|
| 5,742,286 | A * | 4/1998 | Kung et al. .................... | 715/839 |
| 6,478,432 | B1 * | 11/2002 | Dyner ........................... | 359/858 |
| 2007/0273668 | A1 * | 11/2007 | Park et al. ..................... | 345/173 |
| 2009/0064055 | A1 * | 3/2009 | Chaudhri et al. ............. | 715/863 |
| 2009/0210810 | A1 * | 8/2009 | Ryu et al. ...................... | 715/769 |
| 2009/0307631 | A1 * | 12/2009 | Kim et al. ..................... | 715/830 |
| 2010/0058214 | A1 * | 3/2010 | Singh et al. ................... | 715/769 |
| 2010/0070931 | A1 * | 3/2010 | Nichols ......................... | 715/863 |
| 2010/0093400 | A1 * | 4/2010 | Ju et al. ......................... | 455/566 |
| 2010/0218130 | A1 * | 8/2010 | Conrad et al. ................ | 715/769 |
| 2010/0269040 | A1 * | 10/2010 | Lee ................................ | 715/702 |
| 2012/0123865 | A1 * | 5/2012 | Salzano ..................... | 705/14.55 |
| 2013/0147749 | A1 * | 6/2013 | Matthews et al. ............. | 345/173 |

* cited by examiner

*Primary Examiner* — Tuyetlien Tran
*Assistant Examiner* — Jaime Duckworth
(74) *Attorney, Agent, or Firm* — Lee, Hong, Degerman, Kang & Waimey

(57) ABSTRACT

A mobile terminal and controlling method thereof are disclosed. The mobile terminal comprising a touchscreen configured to display a $1^{st}$ region that comprises a $1^{st}$ icon and one or more other icons and a controller configured to control the touchscreen to shift the $1^{st}$ region in a $1^{st}$ direction when the $1^{st}$ icon is selected by a touch and dragged in a $2^{nd}$ direction that is opposite to the $1^{st}$ direction, shift a position of the $1^{st}$ icon to a prescribed zone in the $1^{st}$ region when the dragged $1^{st}$ icon is released over the prescribed zone and arrange the one or more other icons of the $1^{st}$ region according to a prescribed formation.

22 Claims, 29 Drawing Sheets

(a)

(b)

MOBILE TERMINAL AND CONTROLLING METHOD THEREOF

Pursuant to 35 U.S.C. §119(a), this application claims the benefit of earlier filing date and right of priority to Korean Application No. 10-2011-0024306, filed on Mar. 18, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, when an icon is selected and dragged in a predetermined direction, it is particularly suitable for facilitating a position of the selected icon to be changed by shifting an icon displayed region as well in a direction opposite to that of the drag.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

According to a related art, in case of attempting to change a position of a displayed icon by drag & top, since a portion of an icon displayed region is blocked by such a pointer as a finger, a stylus pen and the like, a user has difficulty in checking a position over which the selected icon will be dropped. Hence, the need for settling the difficulty is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a position of a selected icon can be easily changed by shifting an icon displayed region as well in a direction opposite to that of a drag in case of selecting and dragging the icon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a $1^{st}$ region having at least one or more icons arranged in a prescribed formation and a controller, if a $1^{st}$ icon is selected from the at least one or more icons contained in the $1^{st}$ region by a touch and is then dragged in a $1^{st}$ direction, shifting the $1^{st}$ region in a $2^{nd}$ direction opposite to the $1^{st}$ direction to correspond to the drag, the controller, if the $1^{st}$ icon is dropped over a prescribed zone in the $1^{st}$ region, shifting a position of the $1^{st}$ icon to the dropped zone, the controller controlling the shifted $1^{st}$ region to be shifted to a position previous to an input of the drag.

In another aspect of the present invention, a method of controlling a mobile terminal includes the steps of displaying a $1^{st}$ region having at least one or more icons arranged in a prescribed formation, dragging a $1^{st}$ icon selected from the at least one or more icons contained in the $1^{st}$ region in a $1^{st}$ direction, shifting the $1^{st}$ region in a $2^{nd}$ direction opposite to the $1^{st}$ direction to correspond to the drag, dropping the $1^{st}$ icon over a prescribed zone in the $1^{st}$ region, shifting a position of the $1^{st}$ icon to the dropped zone, and shifting the shifted $1^{st}$ region to a position previous to inputting the drag.

Accordingly, the present invention provides the following effects and/or advantages.

First of all, when an icon is selected and dragged in a predetermined direction, the above-configured mobile terminal according to at least one embodiment of the present invention clearly shows a region, over which the selected icon will be dropped, by shifting an icon displayed region in a direction opposite to a drag direction as well, thereby facilitating a position of the selected to be changed.

Secondly, the above-configured mobile terminal according to at least one embodiment of the present invention is able to change a moving speed of the icon displayed region to correspond to a speed of dragging the selected icon.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to describe elements in order to facilitate discussion of the disclosure. Therefore, significant meanings or roles are not assigned to the suffixes themselves, and it is understood that the terms 'module', 'unit' and 'part' can be used together or interchangeably.

Various types of terminals may be implemented using the various techniques or features described herein. Examples of such terminals include mobile terminals as well as stationary terminals. Such terminals may include mobile phones, user equipment, smart phones, digital television (DTV) terminals, computers, digital broadcast terminals, personal digital assistants, portable multimedia players (PMPs), and navigators. For convenience of description, embodiments will be described with reference to a mobile terminal 100. It is understood that described features may be applied in other types of terminals.

Figure 1:
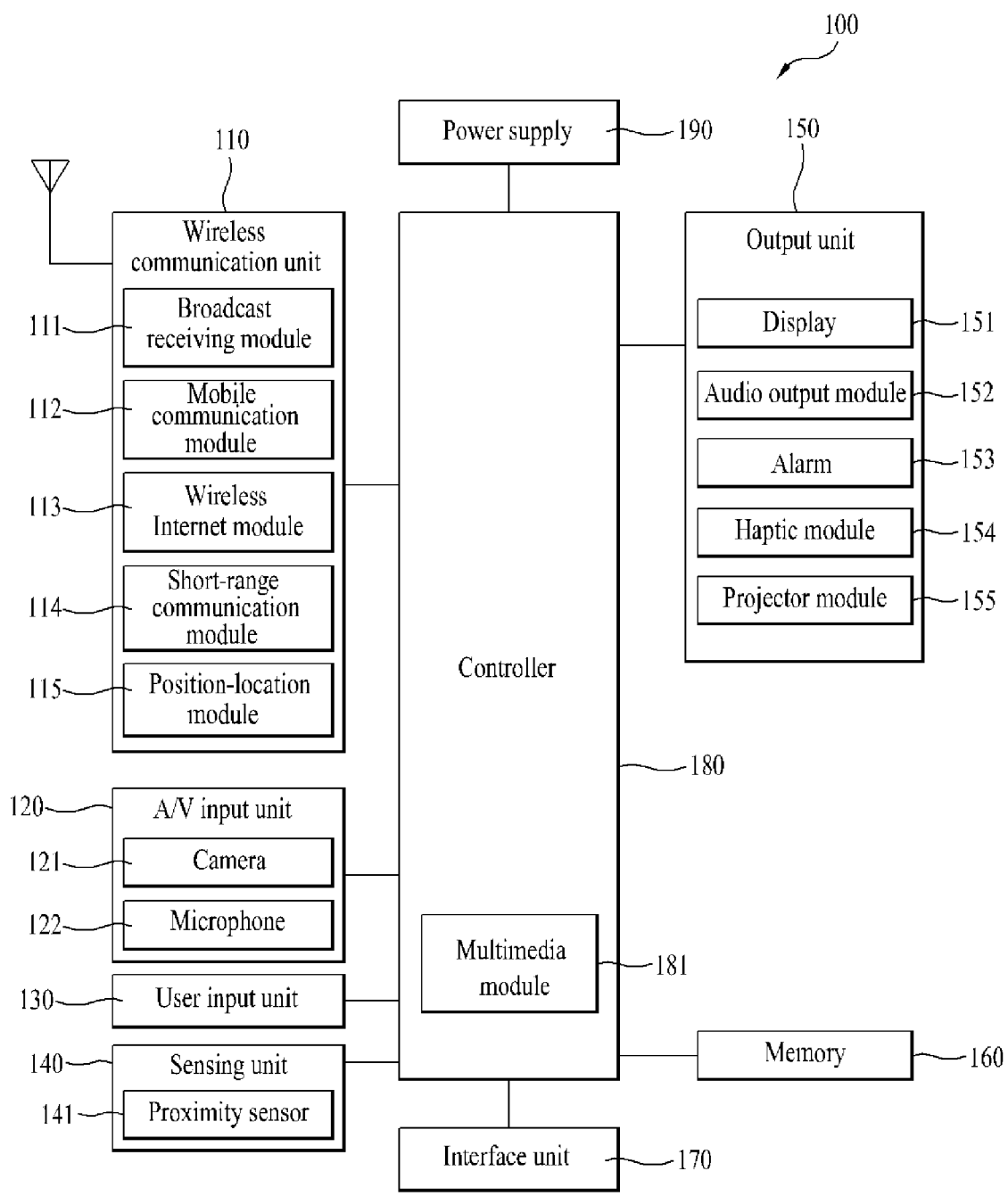
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 has a wireless communication unit 110, an audio/video (A/V) input unit 120, a user input unit 130, a sensing unit 140, an output unit 150, a memory 160, an interface unit 170, a controller 180, and a power supply unit 190. Although the mobile terminal 100 is illustrated as having various components, it is understood that implementing all of the illustrated components is not essential and that more or fewer components may be implemented according to alternative embodiments.

The wireless communication unit 110 may include one or more components which enable wireless communication between the mobile terminal 100 and a wireless communication system or network in which the mobile terminal 100 is located. For instance, the wireless communication unit 110 may include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may be a server which generates and transmits a broadcast signal and/or broadcast associated information or a server which is provided with a previously generated broadcast signal and/or broadcast associated information and then transmits the provided signal or information to a terminal. The broadcast signal and/or broadcast associated information received by the broadcast receiving module 111 may be stored in the memory 160.

The broadcast signal may be implemented, among other signals, as a TV broadcast signal, a radio broadcast signal, or a data broadcast signal. If desired, the broadcast signal may further include a combined TV and radio broadcast signal.

The broadcast associated information may include information associated with a broadcast channel, a broadcast program, or a broadcast service provider. The broadcast associated information may also be provided via a mobile communication network. In this case, the broadcast associated information may be received by the mobile communication module 112.

The broadcast associated information may be implemented in various forms. For instance, the broadcast associated information may be implemented to include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems such as digital multimedia broadcasting-terrestrial (DMB-T), digital multimedia broadcasting-satellite (DMB-S), digital video broadcast-handheld (DVB-H), the data broadcasting system known as media forward link only (MediaFLO™) and integrated services digital broadcast-terrestrial (ISDB-T). Optionally, the broadcast receiving module 111 may be configured to be suitable for other broadcasting systems as well as the previously-identified digital broadcasting systems.

The mobile communication module 112 transmits wireless signals to and/or receives wireless signals from one or more network entities (e.g., a base station, an external terminal, or a server). Such wireless signals may carry audio, video, and text/multimedia messages.

The wireless Internet module 113 supports Internet access for the mobile terminal 100. The wireless Internet module 113 may be internally or externally coupled to the mobile terminal 100. The wireless Internet module 113 may use various wireless Internet technologies such as wireless local area network (WLAN), Wi-Fi™, Wireless broadband (Wibro™), World Interoperability for Microwave Access (Wimax™), and High Speed Downlink Packet Access (HSDPA).

The short-range communication module 114 facilitates relatively short-range communications. Suitable technologies used by the short-range communication module 114 include radio frequency identification (RFID), infrared data association (IrDA), and ultra-wideband (UWB), as well as the networking technologies commonly referred to as Bluetooth™ and ZigBee™.

The position-location module 115 identifies or otherwise obtains the location of the mobile terminal 100. If desired, the position-location module 115 may be implemented with a global positioning system (GPS) module.

The audio/video (A/V) input unit 120 provides audio or video input signals to the mobile terminal 100. The A/V input unit 120 may include a camera 121 and a microphone 122.

The camera 121 receives and processes image frames such as still images (pictures) or moving images (video), which are obtained by an image sensor operating in a video call mode or a photographing mode. The processed image frames may be displayed by the display 151.

The image frames processed by the camera 121 may be stored in the memory 160 or may be externally transmitted to an external device via the wireless communication unit 110. The mobile terminal may include two or more cameras 121 based on the needs of a user.

The microphone 122 receives an external audio signal while the mobile terminal 100 is operating in a particular mode, such as a phone call mode, a recording mode or a voice recognition mode. The audio signal is processed and converted into electronic audio data. The processed audio data is transformed into a format that can be transmitted to a mobile communication base station via the mobile communication module 112 during a phone call mode. The microphone 122 may use assorted noise removal algorithms to remove noise generated in the course of receiving the external audio signal.

The user input unit 130 generates input data in response to user manipulation of an associated input device or input devices. Examples of such devices include a keypad, a dome switch, a static pressure or capacitive touchpad, a jog wheel, and a jog switch.

The sensing unit 140 provides sensing signals for controlling operations of the mobile terminal 100 that use status measurements regarding various aspects of the mobile terminal. For instance, the sensing unit 140 may detect an opened or closed state of the mobile terminal 100, a relative positioning of components of the mobile terminal (e.g., a display and keypad), a change of position of the mobile terminal or a component of the mobile terminal, a presence of user contact with the mobile terminal, an orientation of the mobile terminal, or an acceleration or deceleration of the mobile terminal.

For example, if the mobile terminal 100 is configured as a slide-type mobile terminal, the sensing unit 140 may sense whether a sliding portion of the mobile terminal is in an open or closed position. As other examples, the sensing unit 140 may sense the power provided by the power supply unit 190 or the presence of a coupling or other connection between the interface unit 170 and an external device. If desired, the sensing unit 140 may include a proximity sensor 141.

The proximity sensor 141 of the sensing unit 140 may be located in an internal region of the mobile terminal 100 surrounded by a touchscreen, or near the touchscreen. The proximity sensor 141 may detect the presence of an object approaching a certain sensing surface or an object located near the proximity sensor based on an electromagnetic field strength or an infrared ray without mechanical contact. The proximity sensor 141 may be more durable than a contact type sensor and may be suitable for more utility applications relative to the contact type sensor.

The proximity sensor 141 may include at least a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. When the touchscreen includes the electrostatic capacity proximity sensor, it may also be configured to detect a proximity of a pointer using a variation of an electric field according to the proximity of the pointer. In this situation, the touchscreen (touch sensor) may be considered as a proximity sensor 141.

For convenience of description, an action in which a pointer approaches the touchscreen without actually contacting the touchscreen (but is effectively recognized as a touch of the touchscreen) may be referred to as a 'proximity touch.' An action in which a pointer actually touches the touchscreen may be referred to as a 'contact touch'. The position of the touchscreen that is proximity-touched by the pointer may refer to a portion of the touchscreen that is vertically opposite the pointer when the pointer performs the proximity touch.

The proximity sensor 141 may detect a proximity touch and a proximity touch pattern (e.g., a proximity touch distance, a proximity touch duration, a proximity touch position, a proximity touch shift state). In addition, information corresponding to the detected proximity touch action and the detected proximity touch pattern may be output to the touchscreen.

The output unit 150 generates outputs that may be detected by the senses of sight, hearing and/or touch. The output unit 150 may include a display 151, an audio output module 152, an alarm unit 153, a haptic module 154, and a projector module 155.

The display 151 may display information associated with the mobile terminal 100. For instance, if the mobile terminal 100 is operating in a phone call mode, the display 151 may display a user interface (UI) or graphical user interface (GUI) which provides information associated with placing, conducting, or terminating a phone call. As another example, if the mobile terminal 100 is operating in a video call mode or a photographing mode, the display 151 may display images which are associated with these modes or a UI or a GUI that provides information associated with these modes.

The display 151 may be implemented using known display technologies including, for example, a liquid crystal display (LCD), a thin film transistor-liquid crystal display (TFT-LCD), an organic light-emitting diode display (OLED), a flexible display or a three-dimensional display. The mobile terminal 100 may include one or more of such displays 151.

Some of the displays 151 may be implemented as a transparent or optical transmissive type display, which may be referred to as a transparent display. A representative example of a transparent display is the transparent OLED (TOLED). A rear of the display 151 can be implemented using an optical transmissive type display as well. Accordingly, a user may be able to see an object located behind the body of the mobile terminal 100 through the transparent portion of the display 151 on the body of the mobile terminal.

According to one embodiment, the mobile terminal 100 may include at least two displays 151. For instance, a plurality of displays 151 may be arranged on a single surface of the mobile terminal 100. The displays 151 may be spaced apart from each other or may be integrated as one body. Alternatively, a plurality of displays 151 may be arranged on different surfaces of the mobile terminal 100.

If the display 151 and a sensor for detecting a touch action (i.e., a touch sensor) form a mutual layer structure (i.e., a touchscreen), the display 151 may be used as an input device as well as an output device. In this situation, the touch sensor may be a touch film, a touch sheet, or a touchpad.

The touch sensor may be configured to convert a pressure applied to a specific portion of the display 151 or a variation of a capacitance generated at a specific portion of the display 151 to an electric input signal. Moreover, the touch sensor may detect a pressure, a position, or a size of a touch input.

When a user applies a touch input to the touch sensor, signal(s) corresponding to the touch input may be transferred to a touch controller. The touch controller may then process the signal(s) and then transfer the processed signal(s) to the controller 180. Accordingly, the controller 180 is made aware whether a certain portion of the display 151 is touched.

The audio output module 152 may operate in various modes including a call-receiving mode, a call-placing mode, a recording mode, a voice recognition mode, or a broadcast reception mode in order to output audio data which is received from the wireless communication unit 110 or stored in the memory 160. During operation, the audio output module 152 outputs audio relating to a particular function (e.g., call received, message received). The audio output module 152 may be implemented using at least a speaker, a buzzer, another audio producing device, or a combination of such devices.

The alarm unit 153 may output a signal for announcing the occurrence of a particular event associated with the mobile terminal 100. Typical events include a call reception, a message reception, and a touch input reception.

The alarm unit 153 may output a signal for announcing an event occurrence by way of vibration as well as a video signal or an audio signal. The video signal may be output via the display 151. The audio signal may be output via the audio output module 152. Therefore, the display 151 or the audio output module 152 may be regarded as a part of the alarm unit 153.

The haptic module 154 may generate various tactile effects that can be sensed by a user. Vibration is a representative example of a tactile effect generated by the haptic module 154. A strength and pattern of the vibration generated by the haptic module 154 may be controllable. For instance, vibrations different from one another may be output in a manner of being synthesized together or may be sequentially output.

The haptic module 154 is able to generate various tactile effects as well as vibration. For instance, the haptic module 154 may generate an effect simulating an arrangement of pins vertically moving against a contact skin surface, an injection of air though an injection hole, a suction of air though a suction hole, a skim over a skin surface, a contact with an electrode, an electrostatic force, a production of heat using an endothermic device, or a production of cold using an exothermic device.

The haptic module 154 may be implemented such that a user may sense the tactile effect through muscular sense of a finger or an arm. The haptic module 154 may also transfer the tactile effect through a direct contact. According to an embodiment, the mobile terminal 100 may include at least two haptic modules 154.

The projector module 155 may operate as an image projector of the mobile terminal 100. The projector module 155 may be able to display an image, which is identical to or partially different from at least an image displayed on the display 151, on an external screen or a wall according to a control signal of the controller 180.

In particular, the projector module 155 may include a light source for generating light (e.g., a laser) for projecting an image, an image producing element for producing an image for output using the light generated from the light source, and a lens for enlarging the produced image at a predetermined focus distance. The projector module 155 may further include a device for adjusting an image projection direction by mechanically moving the lens or the entire projector module.

The projector module 155 can be classified as a cathode ray tube (CRT) module, a liquid crystal display (LCD) module, or a digital light processing (DLP) module according to a type of the device or a manner of display. In particular, the DLP module is operated by enabling light generated from the light source to reflect on a digital micro-mirror device (DMD) chip and can be advantageous for reducing a size of the projector module 155.

According to particular embodiments, the projector module 155 may be provided along a length direction of a lateral, front or back surface of the mobile terminal 100. It is understood that the projector module 155 may be provided at any portion of the mobile terminal 100 as needed.

The memory 160 may be used to store various types of data to support the processing, control, and storage requirements of the mobile terminal 100. Examples of such data include program instructions for applications operating in the mobile terminal 100, contact data, phonebook data, messages, audio, still pictures, and moving pictures. In addition, a recent usage history or a cumulative usage frequency of each piece of data (e.g., usage frequency for each phonebook data, each message or each piece of multimedia) can be stored in the memory 160. Moreover, data regarding various patterns of vibration and/or sound that are output when a touch input is applied to the touchscreen may be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or another similar memory or data storage device. The mobile terminal 100 may also operate in association with a web storage for performing a storage function of the memory 160 on the Internet.

The interface unit 170 may couple the mobile terminal 100 with external devices. The interface unit 170 may receive data or be supplied with power from the external devices, transfer the data or power to components of the mobile terminal 100, or facilitate transfer of data of the mobile terminal 100 to the external devices. The interface unit 170 may be configured using at least a wired/wireless headset port, an external charger port, a wired/wireless data port, a memory card port, a port for coupling to a device having an identity module, audio input/output ports, video input/output ports, or an earphone port.

The identity module may be a chip for storing various kinds of information for authenticating a usage authority of the mobile terminal 100. The identity module may include at least a User Identity Module (UIM), a Subscriber Identity Module (SIM), or a Universal Subscriber Identity Module (USIM). A device having the identity module (hereinafter referred to as an 'identity device') may be manufactured as a smart card. Therefore, the identity device is connectable to the mobile terminal 100 via a corresponding port.

When the mobile terminal 100 is connected to an external cradle, the interface unit 170 may serve as a passage for supplying the mobile terminal 100 with power from the cradle or a passage for delivering various command signals input by a user via the cradle to the mobile terminal 100. The various command signals input via the cradle or the power may operate as a signal enabling the mobile terminal 100 to recognize that it is correctly loaded in the cradle.

The controller 180 may control the overall operations of the mobile terminal 100. For example, the controller 180 may perform the control and processing associated with voice calls, data communications, or video calls. The controller 180 may include a multimedia module 181 that provides multimedia playback. The multimedia module 181 may be configured as part of the controller 180 or implemented as a separate component. Moreover, the controller 180 may perform a pattern recognizing process for recognizing handwriting input or picture-drawing input applied to the touchscreen as characters or images.

The power supply unit 190 provides power required by the various components of the mobile terminal 100. The power may be internal power, external power, or a combination of internal power and external power.

Various embodiments described herein may be implemented in a computer-readable medium using, for example, computer software, hardware, or a combination of computer software and hardware. According to a hardware implementation, embodiments described herein may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination of the noted devices. Feature described herein may also be implemented by the controller 180.

According to a software implementation, embodiments described herein may be implemented using separate software modules, such as procedures and functions, each of which perform one or more of the functions and operations described herein. Software code may be implemented using a software application written in a suitable programming language. The software may be stored in a memory device such as the memory 160, and may be executed by a controller or processor, such as the controller 180.

Figure 2:
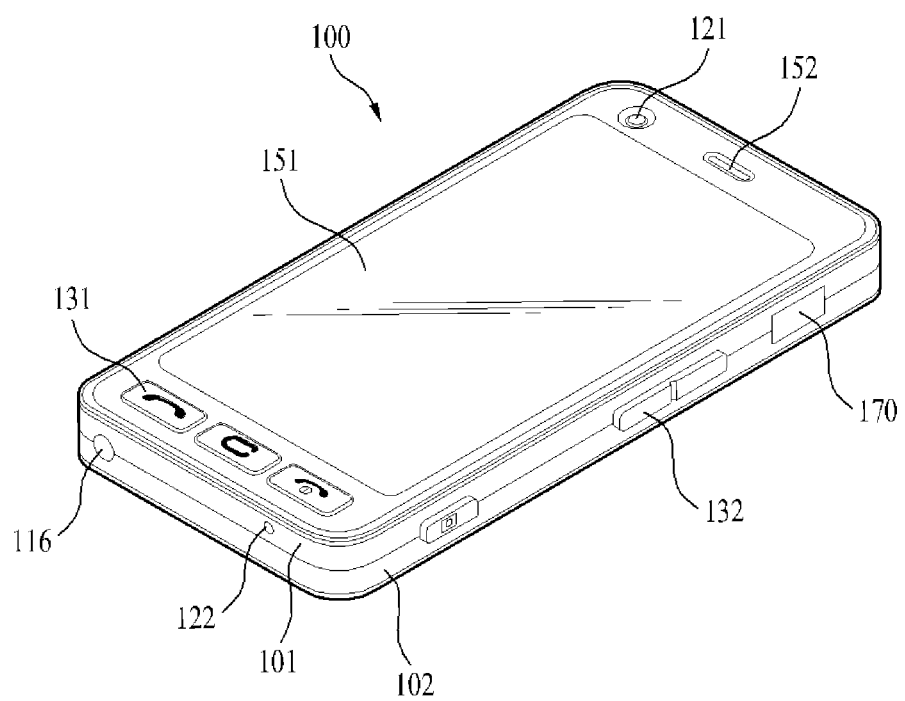
FIG. 2 is a front perspective diagram of a mobile terminal according to one embodiment of the present invention.

FIG. 2 is a front perspective diagram of a mobile terminal according to an embodiment of the present invention. The mobile terminal 100 has a bar type terminal body. However, according to other embodiments, the mobile terminal 100 may have other configurations including folder-type, slide-type, rotational-type, swing-type, or a combination of these configurations. For purposes of clarity, embodiments will be described with reference to a bar-type mobile terminal 100. However, it is understood that described features may apply equally to other types of mobile terminals.

With continued reference to FIG. 2, the mobile terminal 100 includes a case (casing, housing, or cover) forming an exterior of the mobile terminal. The case may be divided into a front case 101 and a rear case 102. Various electric/electronic components are positioned or otherwise located in a space or cavity defined between the front case 101 and the rear case 102. At least one middle case may also be provided between the front case 101 and the rear case 102. The cases 101 and 102 may be formed by injection molding of a synthetic resin or may be made of a metal material such as stainless steel (STS) or titanium (Ti).

The display 151, audio output module 152, camera 121, user input unit 130 (e.g., first and second operating units 131 and 132), microphone 122, and interface unit 170 may be arranged in the terminal body, and, more particularly, in the front case 101.

The display 151 may occupy a majority of the area of a main face of the front case 101. The audio output module 152 and the camera 121 may be arranged in a region adjacent to an end portion of the display 151. The first operating unit 131 and the microphone 122 may be arranged in a region adjacent to the other end portion of the display 151. The second operating unit 132 and the interface unit 170 may be arranged on lateral sides of the front case 101 and the rear case 102.

The user input unit 130 is operable to receive a command for controlling operation of the mobile terminal 100. The user input unit 130 may include the first and second operating units 131 and 132. The first and second operating units 131 and 132 may be referred to as manipulating portions and may employ a tactile mechanism by which a user operates the first and second operating units by touch.

The first and second operating units 131 and 132 may receive various inputs. For instance, the first operating unit 131 may receive commands such as start, end, or scroll, and the second operating unit 132 may receive commands for controlling a volume adjustment of sound output from the audio output module 152, or for switching a mode of the display 151 to a touch recognition mode.

An operational relationship between the display 151 and a touchpad 135 (or touchscreen) is explained with reference to FIG. 3.

Figure 3:
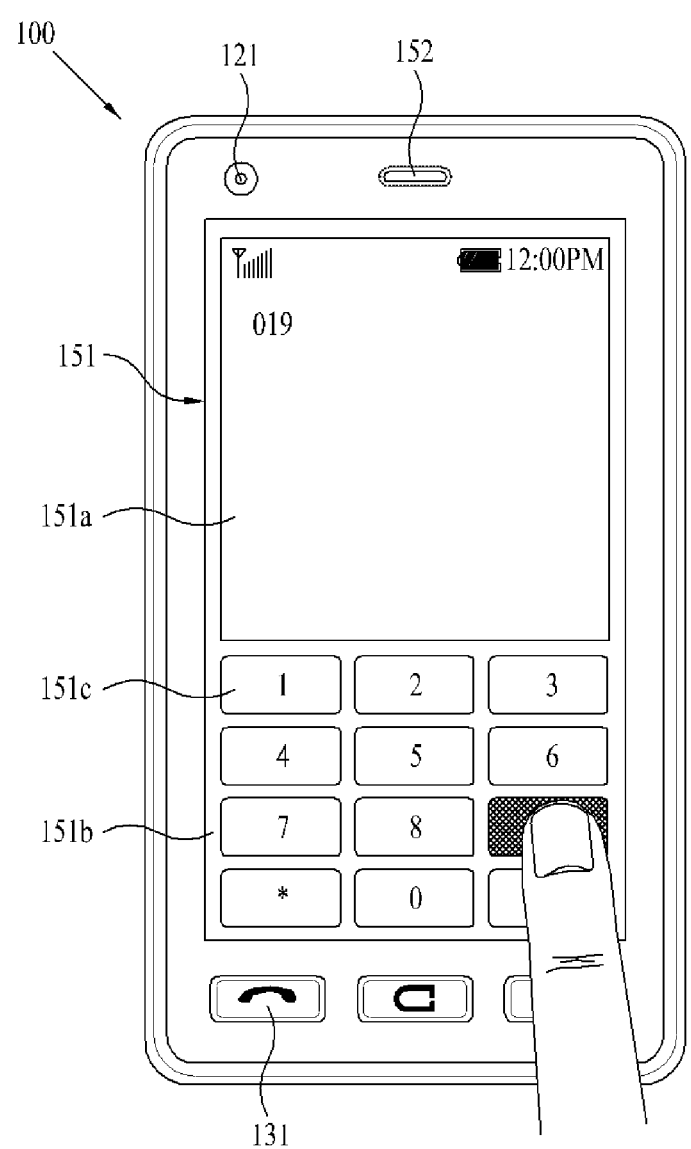
FIG. 3 is a front diagram of a mobile terminal according to one embodiment of the present invention to describe one operating status thereof.

FIG. 3 is a view of a screen display of a mobile terminal 100 according to an embodiment of the present invention. Various types of information may be displayed for viewing on the display 151. The information displayed may include characters, numerals, symbols, graphics, and icons. To facilitate input of information, at least characters, numerals, symbols, graphics or icons are presented as a single predetermined array in a formation of a keypad. The keypad may be referred to as 'soft keys'.

As illustrated in FIG. 3, a touch applied to a soft key is input via a front face of the mobile terminal 100. The display 151 is operable via an entire area of the display or one or more regions of the display. In the latter situation, a plurality of regions may be configured to be interoperable.

For instance, an output window 151a and an input window 151b are displayed on the display 151. A soft key 151c representing a digit for inputting a phone number, for example, is output to the input window 151b. If the soft key 151c is touched, a digit corresponding to the touched soft key is output to the output window 151a. If the first operating unit 131 is operated, a call connection for a phone number displayed on the output window 151a is attempted.

In addition, the display 151 may be configured to receive an input for scrolling. A user may scroll the display 151 to shift a cursor or pointer positioned at an entity (e.g., an icon) that is displayed on the display. Furthermore, if a finger is moved along the display 151, a path of the moving finger may be displayed on the display. This may be useful when editing an image displayed on the display 151.

The display (touch screen) 151 and the touchpad 135 may be touched together within a predetermined or threshold time range in order to cause an execution of a function of the mobile terminal 100. A simultaneous touch may occur when the body of the mobile terminal 100 is held by a user using a thumb and a first finger (clamping). The function that is executed may include activation or deactivation of the display 151 or the touchpad 135.

For clarity and convenience of the following description, assume that a mobile terminal 100 mentioned in the following description includes at least one of the components shown in FIG. 1.

Assume that a display unit of the present invention includes a touchscreen.

Generally, a graphic of an arrow or finer type for indicating a pointing at a specific object or selecting a menu on the display unit 151 is called a pointer or a cursor.

Occasionally, the pointer means such a means for a touch manipulation as a finger, a stylus pen and the like.

Therefore, in order to clearly distinguish the pointer and the cursor from each other, a graphic displayed on the display unit 151 shall be named a cursor, while such a physical means for performing a touch, a proximity touch, a gesture and the like as a finger or a stylus pen shall be named a pointer.

A plurality of icons can be arranged on a touchscreen of a terminal in a manner of configuring a prescribed formation. If at least one icon is selected from a plurality of the icons, a position of the selected at least one icon can be changed by drag & drop.

Yet, in case of changing a position of a selected icon by drag & drop according to a related art, since a pointer necessary for a corresponding drag blocks a portion of a region for displaying the icon, it may cause one problem that a user has a difficulty in checking a position over which the selected icon will be dropped.

Moreover, since it is difficult to display a whole part of an icon displayable region due to a limited size of a touchscreen, there is another problem that a user has difficulty in checking a hidden region (not displayed on the touchscreen) over which a selected icon can be dropped.

In this case, while an icon is selected and then dragged in a predetermined direction, if an icon displayed region is shiftable as well in a direction opposite to that of a corresponding drag, a user will be able to clearly check a region over which the selected icon will be dropped. Therefore, it is able to provide a function of changing a position of the selected icon easily and conveniently.

According to the present invention, provided is a method of if at least one of a plurality of icons displayed on a touchscreen is selected and dragged, shifting an icon displayable region in a direction opposite to a drag direction, if the selected icon is dropped over a prescribed region, shifting a position of the selected icon to the dropped region, and shifting the shifted icon displayable region to an original position.

In the following description, the present invention is explained in detail with reference to FIG. 4.

Figure 4:
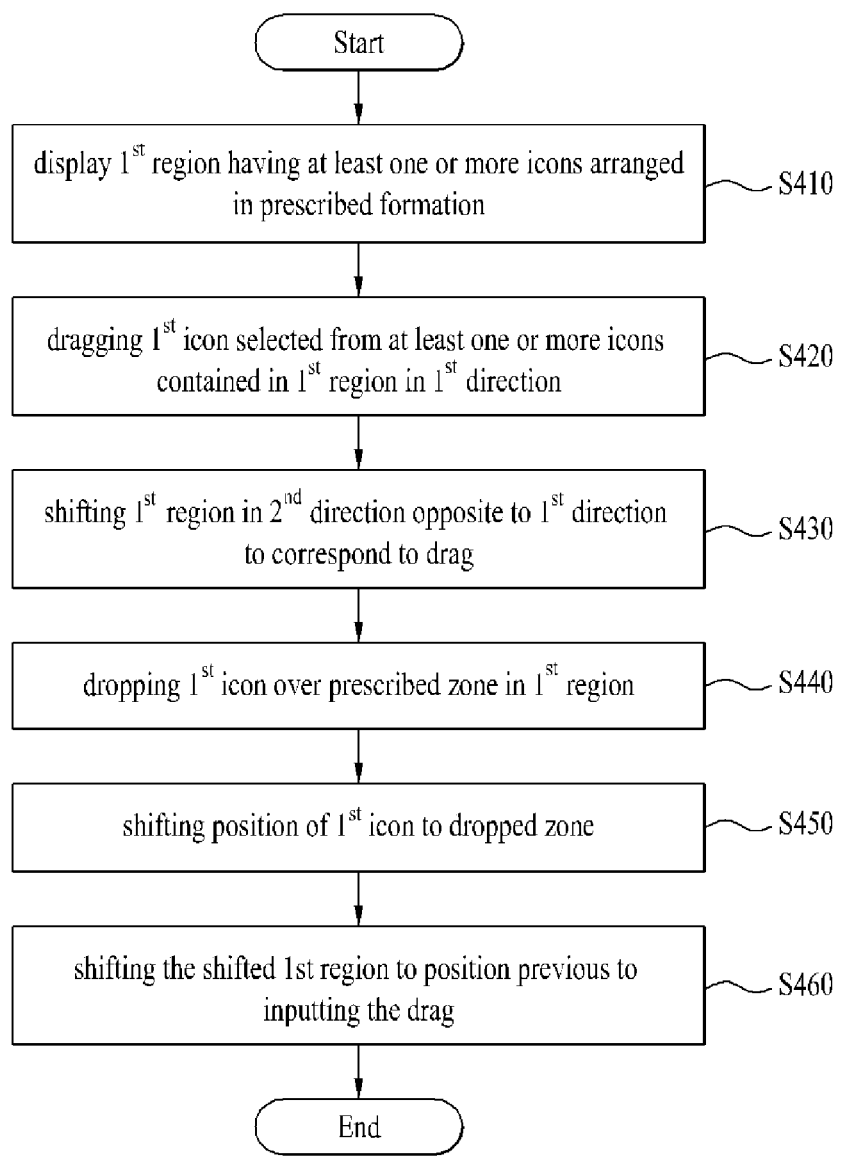
FIG. 4 is a flowchart for one example of shifting an icon displayed region in an opposite direction as well in case of dragging a selected icon according to one embodiment of the present invention.

FIG. 4 is a flowchart for one example of shifting an icon displayed region in an opposite direction as well in case of dragging a selected icon according to one embodiment of the present invention.

Referring to FIG. 4, a plurality of icons can be displayed on a touchscreen in a manner of being arranged in prescribed formation [S410]. If a region for arranging a plurality of icons is greater than a display region of the touchscreen, information is provided to a user in a manner of being matched to the display region of the touchscreen.

For clarity and convenience of the following description, the region, in which a plurality of the icons are arranged in the prescribed formation, shall be named a $1^{st}$ region.

Once the $1^{st}$ region is displayed, one of a plurality of the icons contained in the $1^{st}$ region can be selected and dragged in a predetermined direction [S420].

In the selected icon is dragged, the controller 180 shifts the $1^{st}$ region in a direction opposite to the drag direction to correspond to the drag [S430].

In doing so, a speed of shifting the $1^{st}$ region can be arbitrarily set by a user. For instance, if the $1^{st}$ region shifted speed is set to correspond to the speed of dragging the selected icon, the shift speed of the $1^{st}$ region can be changed in accordance with the drag speed of the selected icon. Moreover, the user is able to set the $1^{st}$ region shifted speed equal to, lower than or higher than the drag speed. Yet, the above description is just exemplary, by which the present invention is non-limited.

If the $1^{st}$ region is shifted, the user is able to drop the selected icon over a portion of the $1^{st}$ region [S440].

If the selected icon is dropped over the portion of the $1^{st}$ region, the controller 180 shifts a position of the selected icon to the drop region [S450].

If the position of the selected icon is changed, the controller 180 controls the shifted $1^{st}$ region to return to an original position before an input of the drag [S460].

Thus, if an icon is selected and then dragged in a predetermined direction, a $1^{st}$ region is shifted as well in a direction opposite to the drag direction to enable a user to check an icon droppable region clearly. Hence, the user is able to change a position of the selected icon with ease.

For clarity and convenience of the following description, a dragged icon shall be named a $1^{st}$ icon. A direction, in which the $1^{st}$ icon is dragged, shall be named a $1^{st}$ direction. And, a direction, in which the $1^{st}$ region is shifted, opposite to the $1^{st}$ direction shall be named a $2^{nd}$ direction.

To help the understanding of the present invention, one example of the present invention is described with reference to FIG. 5.

FIG. 5 is a diagram for one example of shifting an icon displayed region in an opposite direction as well in case of dragging a selected icon according to one embodiment of the present invention.

Referring to FIG. 5, assume that a $1^{st}$ direction is a bottom side direction of a touchscreen. And, assume that a speed of shifting of a $1^{st}$ region is set equal to that of dragging a $1^{st}$ icon.

Figure 5A:
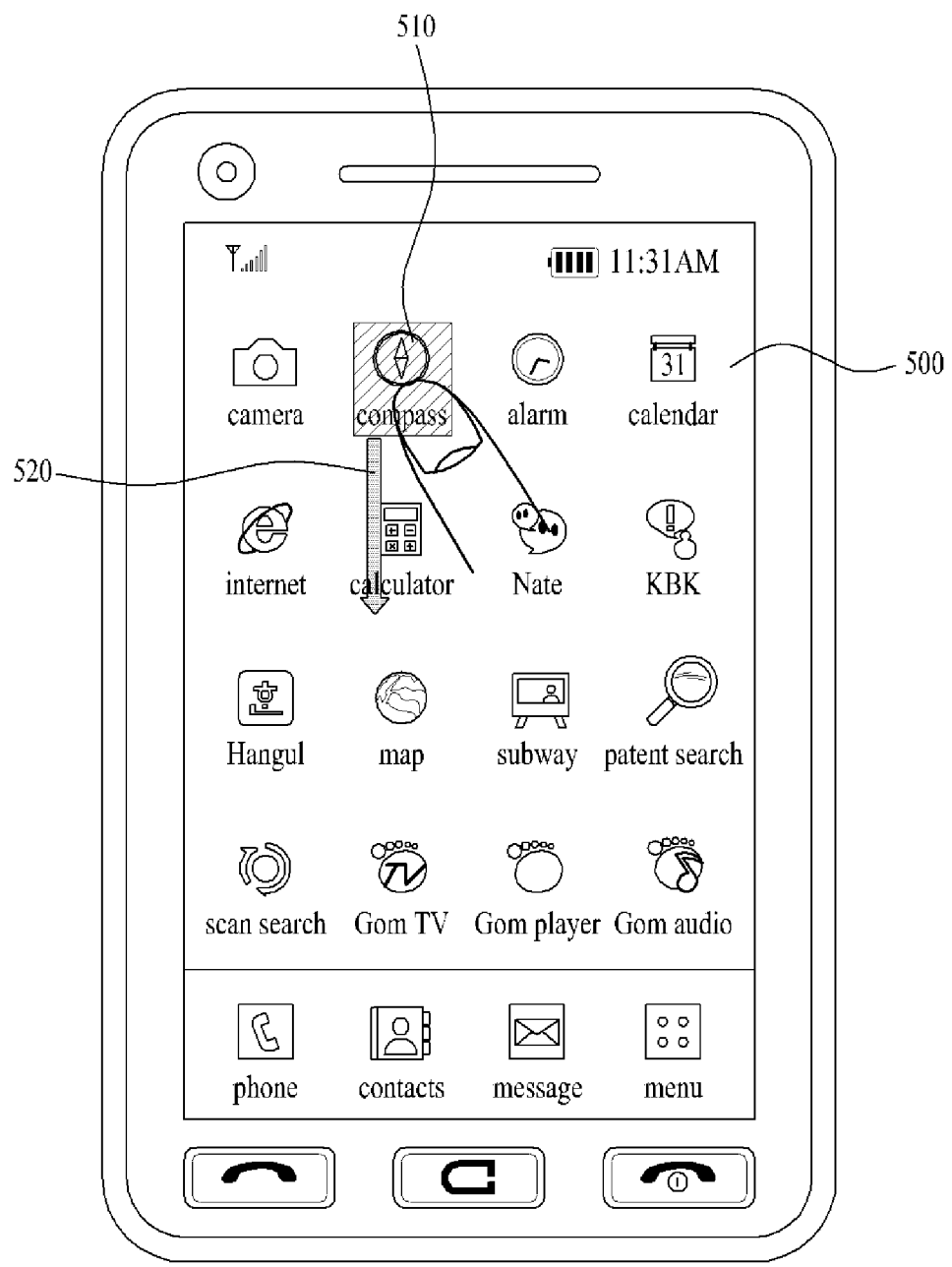
FIGS. 5A, 5B and 5C are diagrams for one example of shifting an icon displayed region in an opposite direction as well in case of dragging a selected icon according to one embodiment of the present invention.

Referring to FIG. 5A, a $1^{st}$ region 500 having a plurality of icons arranged therein is displayed on the touchscreen. A user selects a map icon 510 by a touch and is then able to drag the selected map icon 510 in a $1^{st}$ direction that is a bottom side direction of the touchscreen.

Figure 5B:
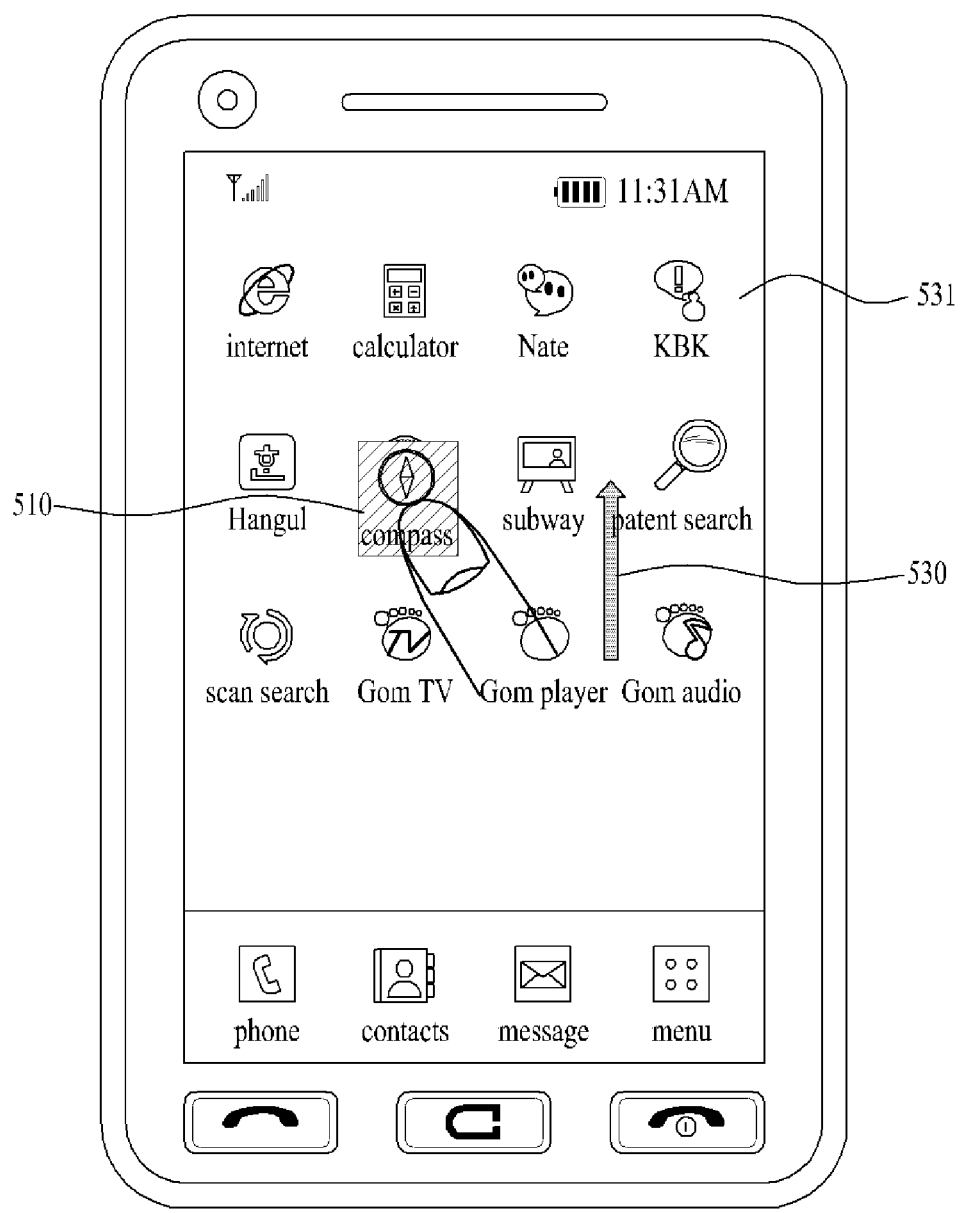

Once the map icon 510 is dragged in the $1^{st}$ direction 520, referring to FIG. 5B, the controller 180 shifts the $1^{st}$ region 500 in a $2^{nd}$ direction 530 opposite to the $1^{st}$ direction. Hence, unlike FIG. 5A, FIG. 5B shows that a hidden region 531, in which icons can be arranged, is displayed on the touchscreen.

Figure 5C:
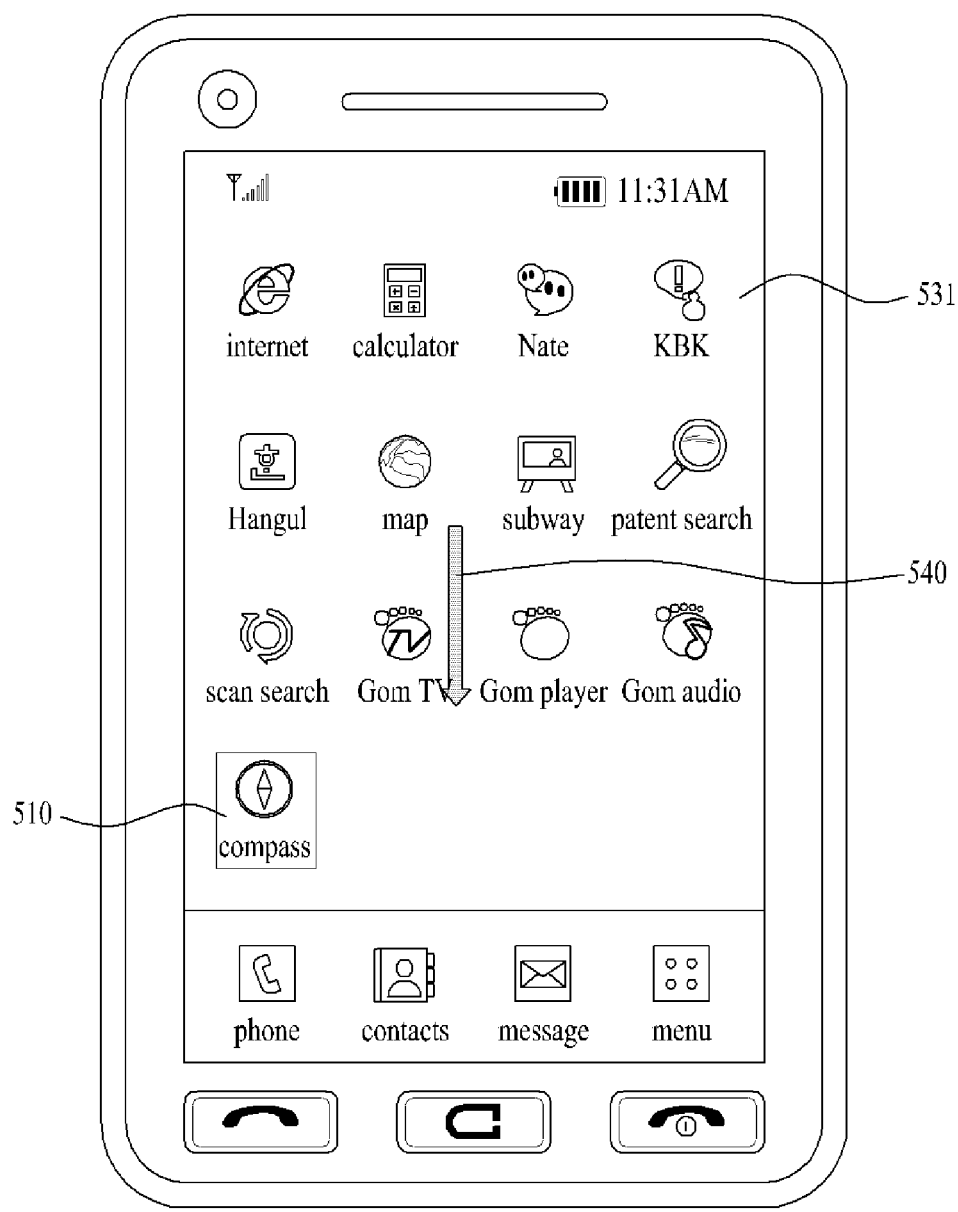

If the dragged map icon 510 is dropped over a portion of the icon arrangeable hidden region 531, referring to FIG. 5C, the controller 180 shifts a position of the map icon 510 to the drop region and also controls the shifted $1^{st}$ region to be shifted in the $1^{st}$ direction 540 to return to an original position.

Meanwhile, according to one embodiment of the present invention, a method of determining a $2^{nd}$ direction through at least one preset coordinates can be provided.

In particular, the controller 180 checks coordinates closest to a $1^{st}$ direction for dragging a $1^{st}$ icon with reference to a plurality of coordinates respectively preset in different directions and is then able to determine an opposite direction of the checked coordinates to become a $2^{nd}$ direction.

In this case, the direction of each of a plurality of the coordinates is previously set to a default in manufacturing the terminal or can be arbitrarily changed by a user.

Therefore, since the direction for dragging the $1^{st}$ icon is unclear, if it is difficult to determine the $2^{nd}$ direction, the present invention is able to clearly set the $2^{nd}$ direction using the coordinates, thereby providing convenience to a user.

This is described in detail with reference to FIG. 6 as follows.

FIG. 6 is a diagram for one example of determining a direction for shifting an icon displayed region using a plurality of coordinates in different directions according to one embodiment of the present invention.

Referring to FIG. 6, assume that 4 kinds of coordinates exist. And, assume that the 4 kinds of the coordinates correspond to top, right, bottom and left directions of a touchscreen, respectively.

Figure 6A:
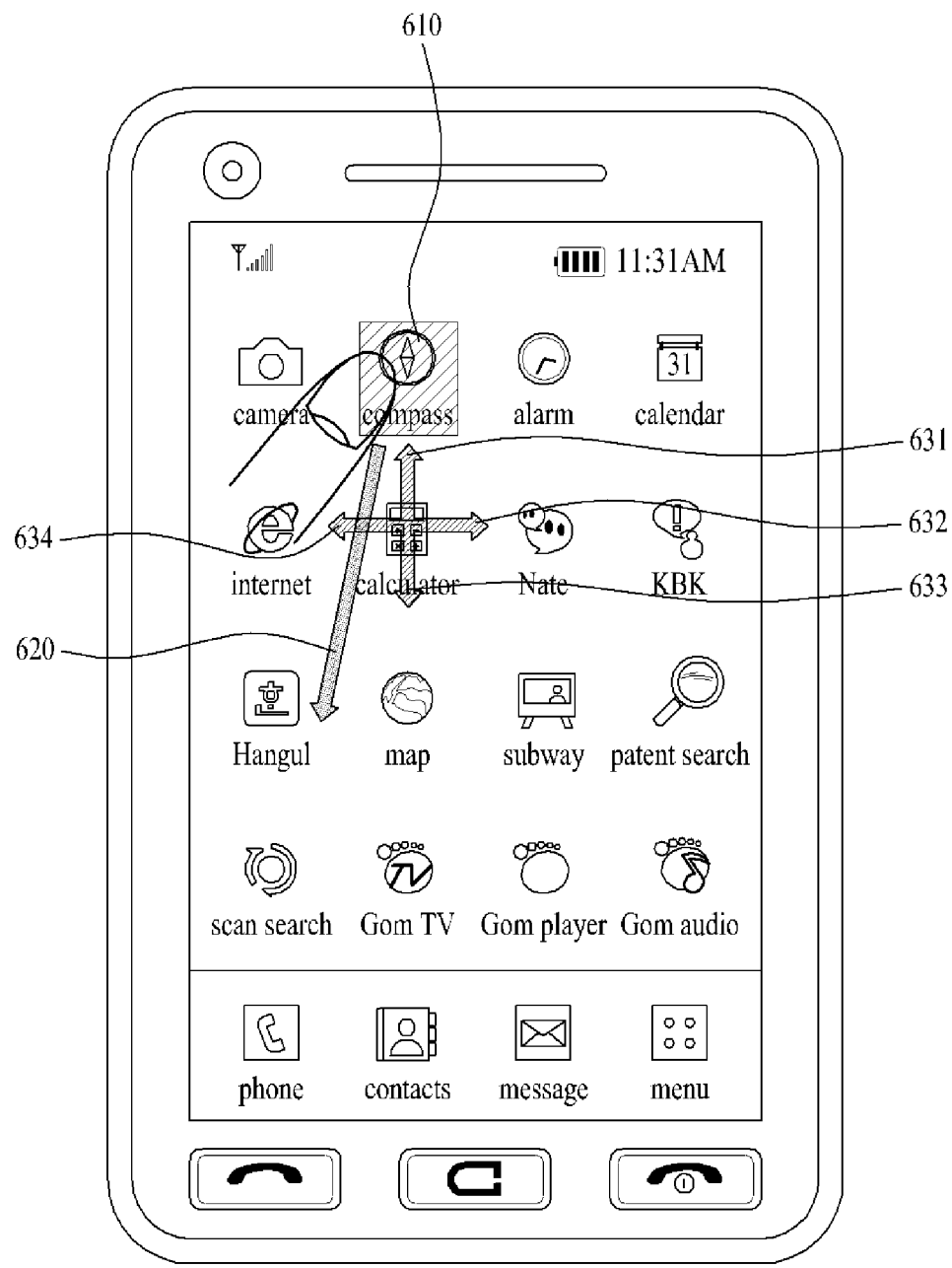
FIGS. 6A and 6B are diagrams for one example of determining a direction for shifting an icon displayed region using a plurality of coordinates in different directions according to one embodiment of the present invention.

Referring to FIG. 6A, a user selects a map icon 610 in a $1^{st}$ region and is then able to drag the selected map icon 610 in a $1^{st}$ direction 620. In this case, the controller 180 is able to determine whether the $1^{st}$ direction is closest to which one of $1^{st}$ coordinates 631, $2^{nd}$ coordinates 632, $3^{rd}$ coordinates 633 and $4^{th}$ coordinates.

In FIG. 6A, since the $1^{st}$ direction 620 is closest to the $3^{rd}$ coordinates 633, the controller 180 is able to determine the $2^{nd}$ direction as a direction opposite to the $3^{rd}$ coordinates 633.

Figure 6B:
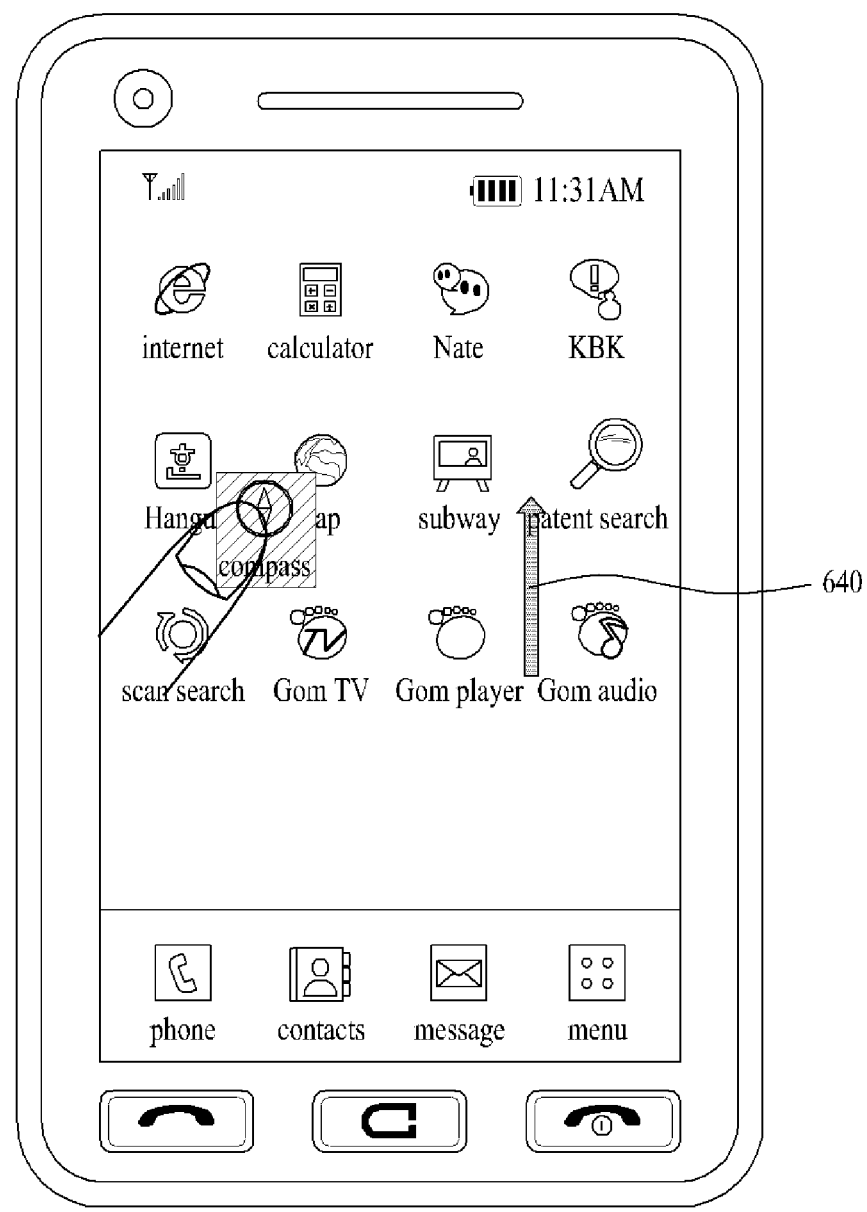

Once the controller 180 determines the $2^{nd}$ direction, referring to FIG. 6B, the controller 180 shifts the $1^{st}$ region in the direction 640 opposite to the $3^{rd}$ coordinates.

According to one embodiment of the present invention, if a $1^{st}$ icon is dragged, the controller 180 is able to provide a function of tilting the $1^{st}$ icon at a preset angle in a $1^{st}$ direction.

If the $1^{st}$ icon is tilted in the $1^{st}$ direction, it is advantageous in that a user is facilitated to visually recognize a direction of dragging the $1^{st}$ icon.

In this case, the angle for tilting the $1^{st}$ icon is designated in advance or can be arbitrarily designated by a user.

This is described in detail with reference to FIG. 7 as follows.

Figure 7:
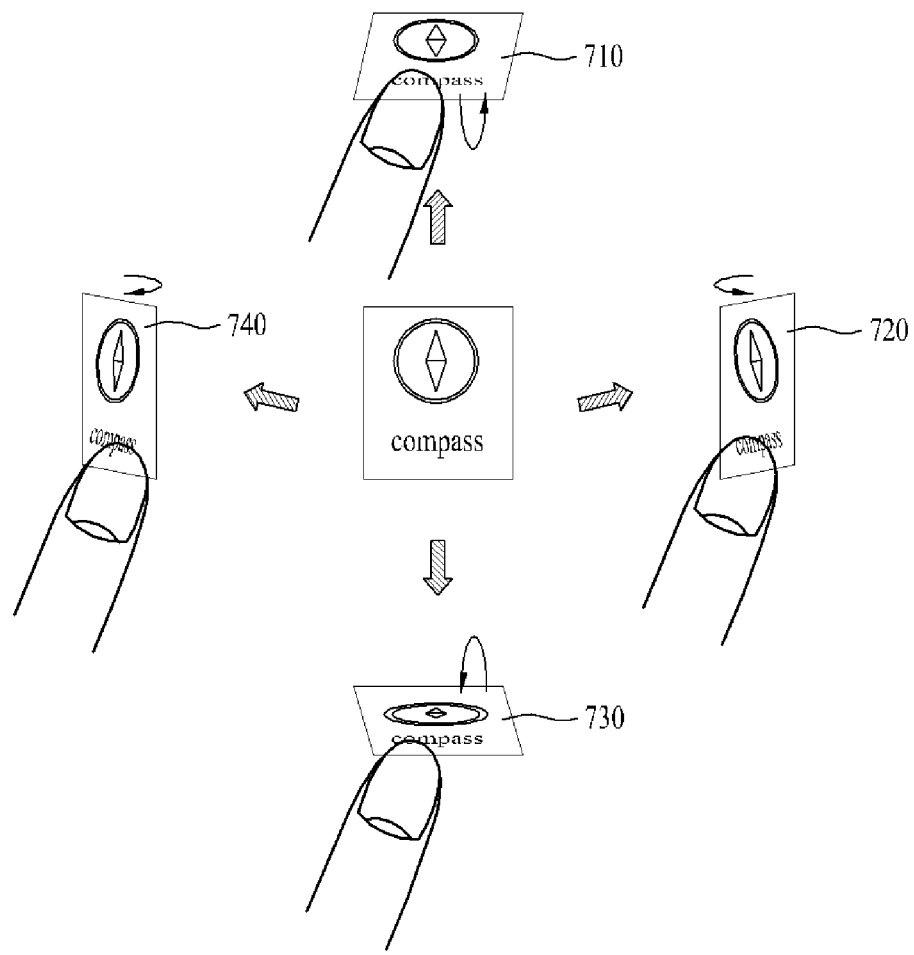
FIG. 7 is a diagram for one example of tilting a selected icon at a predetermined angle in a direction for shifting the selected icon displayed region according to one embodiment of the present invention.

FIG. 7 is a diagram for one example of tilting a selected icon at a predetermined angle in a direction for shifting the selected icon displayed region according to one embodiment of the present invention.

In FIG. 7, assume that an angle for tilting a $1^{st}$ icon is set to 70 degrees.

Referring to FIG. 7, if a $1^{st}$ direction is a top direction of a touchscreen, a $1^{st}$ icon is dragged by being tilted at 70 degrees in a top direction [710]. If a $1^{st}$ direction is a right direction of a touchscreen, a $1^{st}$ icon is tilted at 70 degrees in a right direction [720].

If a $1^{st}$ direction is a bottom direction of a touchscreen, a $1^{st}$ icon is dragged by being tilted at 70 degrees in a bottom direction [730]. If a $1^{st}$ direction is a left direction of a touchscreen, a $1^{st}$ icon is tilted at 70 degrees in a left direction.

According to one embodiment of the present invention, the controller 180 is able display a visual effect, which informs a user that a $1^{st}$ region is shifted in a $2^{nd}$ direction, on a prescribed region of a touchscreen.

In particular, in a manner of giving at least one of various effects including a color, a pattern of a surface texture, a flickering, a size variation, a shape variation of at least one portion and the like to a partial region of a touchscreen, a user can be explicitly informed that a $1^{st}$ region is shifted in a $2^{nd}$ direction. Alternatively, it is able to use a method of displaying a $2^{nd}$ direction clearly via an indicator. The above items related to the visual effects are just exemplary, by which the present invention is non-limited.

The above description is explained in detail with reference to FIG. 8 as follows.

Figure 8:
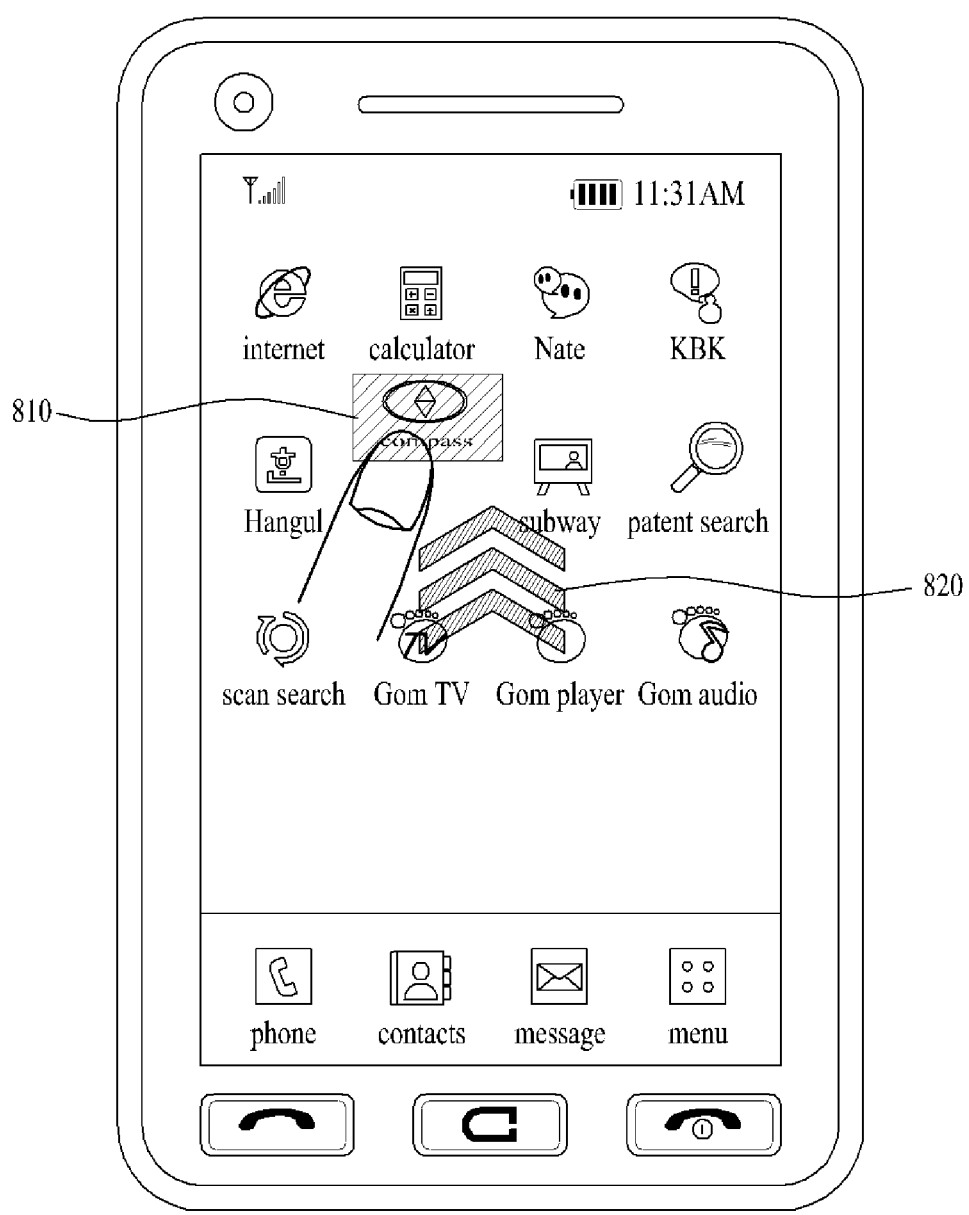
FIG. 8 is a diagram for one example of displaying a visual effect indicating that an icon displayed region is shifted according to one embodiment of the present invention.

FIG. 8 is a diagram for one example of displaying a visual effect indicating that an icon displayed region is shifted according to one embodiment of the present invention.

In FIG. 8, assume that an indicator is displayed as a visual effect on a partial region of a touchscreen.

Referring to FIG. 8, if a $1^{st}$ icon 810 is selected and dragged in a bottom direction of a touchscreen, a $1^{st}$ region is shifted in a top direction opposite to the bottom direction.

In doing so, in order to explicitly inform a user of a $2^{nd}$ direction in which the $1^{st}$ region is shifted, the controller 180 is able to display an indicator 820 on a partial region of the touchscreen.

Therefore, the user is able to visually recognize that the $1^{st}$ region is shifted in the top direction, thereby checking the $2^{nd}$ direction quickly.

According to one embodiment of the present invention, when a $1^{st}$ icon is dragged, the controller 180 is able to give a prescribed visual effect to a region in a $1^{st}$ region over which the $1^{st}$ icon can be dropped.

Through the prescribed visual effect, a user is able to visually check a position over which the $1^{st}$ icon can be dropped.

In the following description, a detailed embodiment of giving a prescribed visual effect to a region, over which a $1^{st}$ icon can be dropped, is explained in detail with reference to FIG. 9.

FIG. 9 is a diagram for one example of giving a prescribed visual effect to a region, over which a selected icon can be dropped, according to one embodiment of the present invention.

Figure 9A:
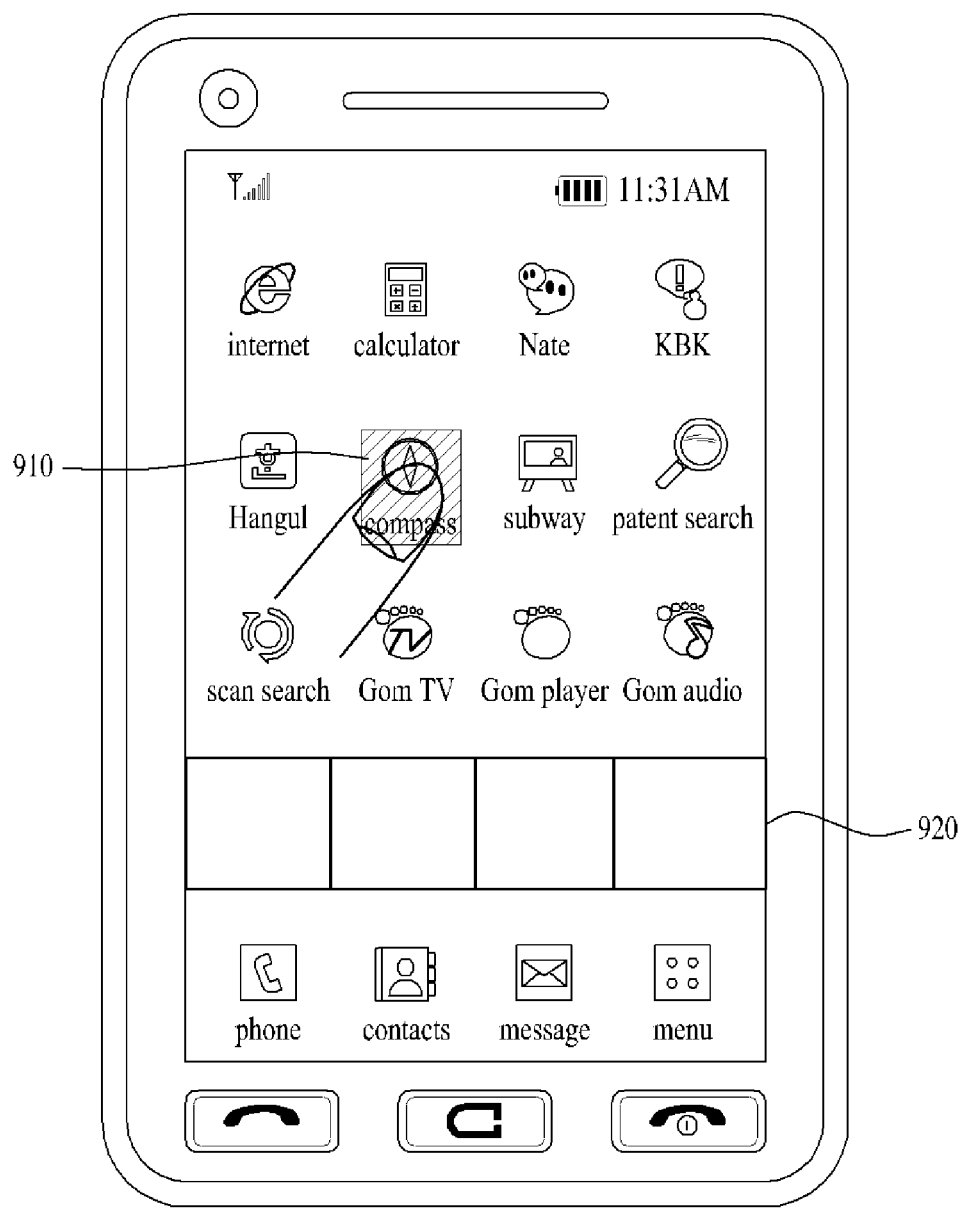
FIGS. 9A, 9B, 9C, 9D, 9E and 9F are diagrams for one example of giving a prescribed visual effect to a region, over which a selected icon can be dropped, according to one embodiment of the present invention.

Referring to FIG. 9A, if a map icon 910 is selected and dragged in a $1^{st}$ direction, the controller 180 is able to provide a function of displaying a region, over which the map icon 910 can be dropped, by partitioning the map icon droppable region into lattices [920]. Hence, a user selects one of the lattices 920 and is then able to drop the map icon 910 over the selected lattice.

Figure 9B:
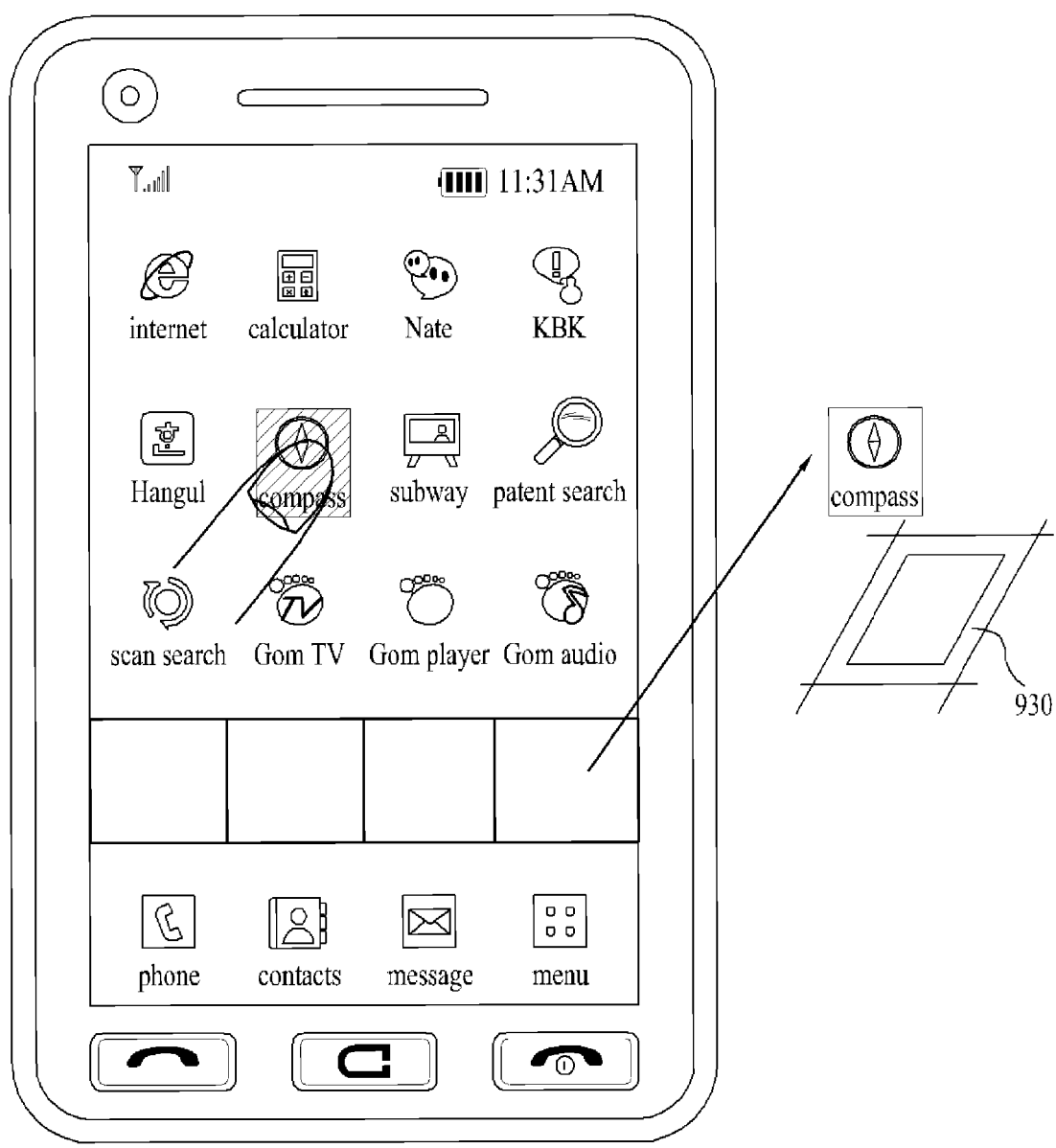

Referring to FIG. 9B, if the map icon 910 is dragged to the droppable region, the controller 180 is able to explicitly display that the corresponding region is the droppable region by tilting the corresponding region at a prescribed angle.

Figure 9C:
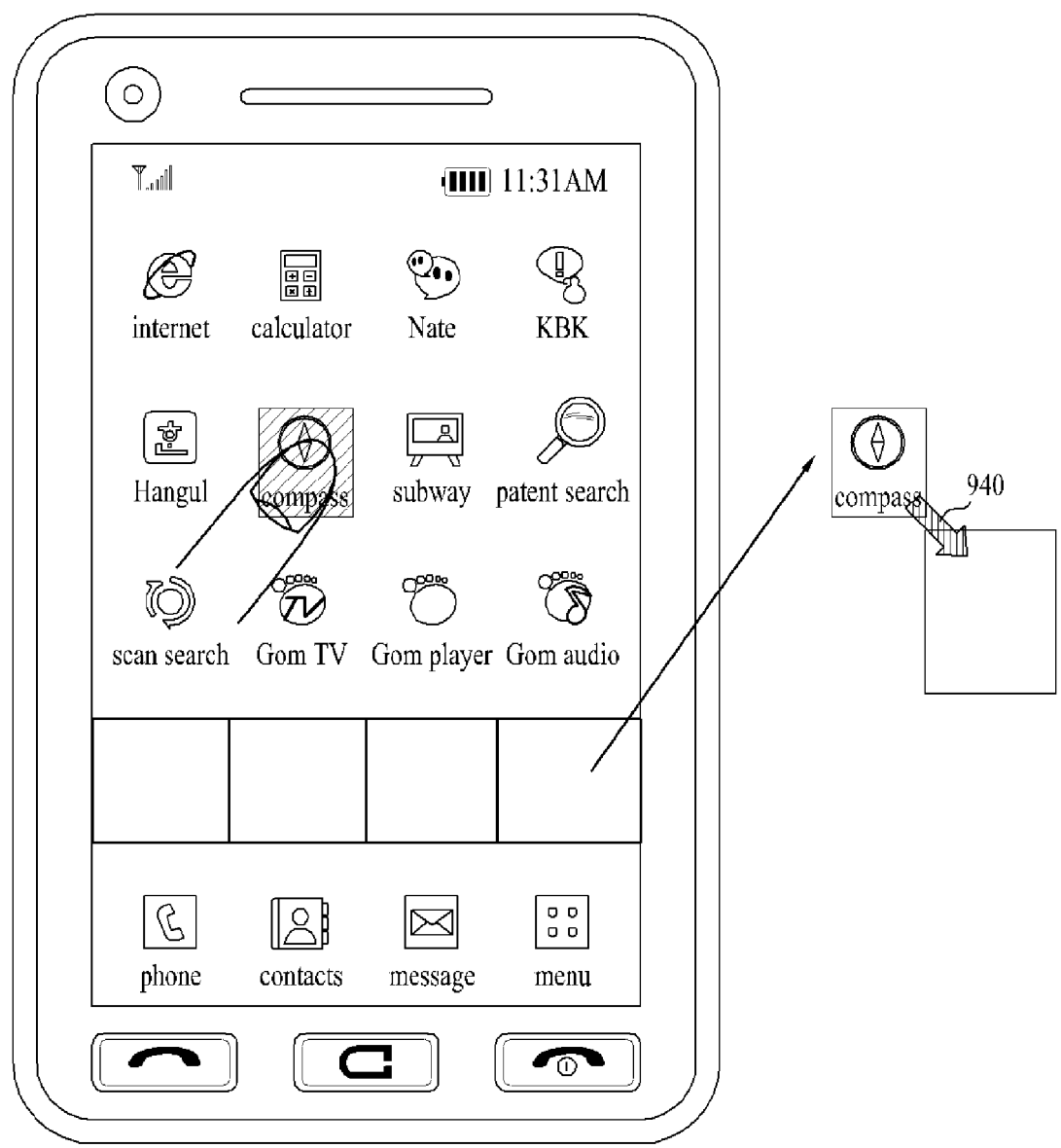

Regarding an indicator, referring to FIG. 9C, an indicator 940 is displayed on the map icon droppable region, thereby informing a user clearly that the map icon 910 can be dropped.

Figure 9D:
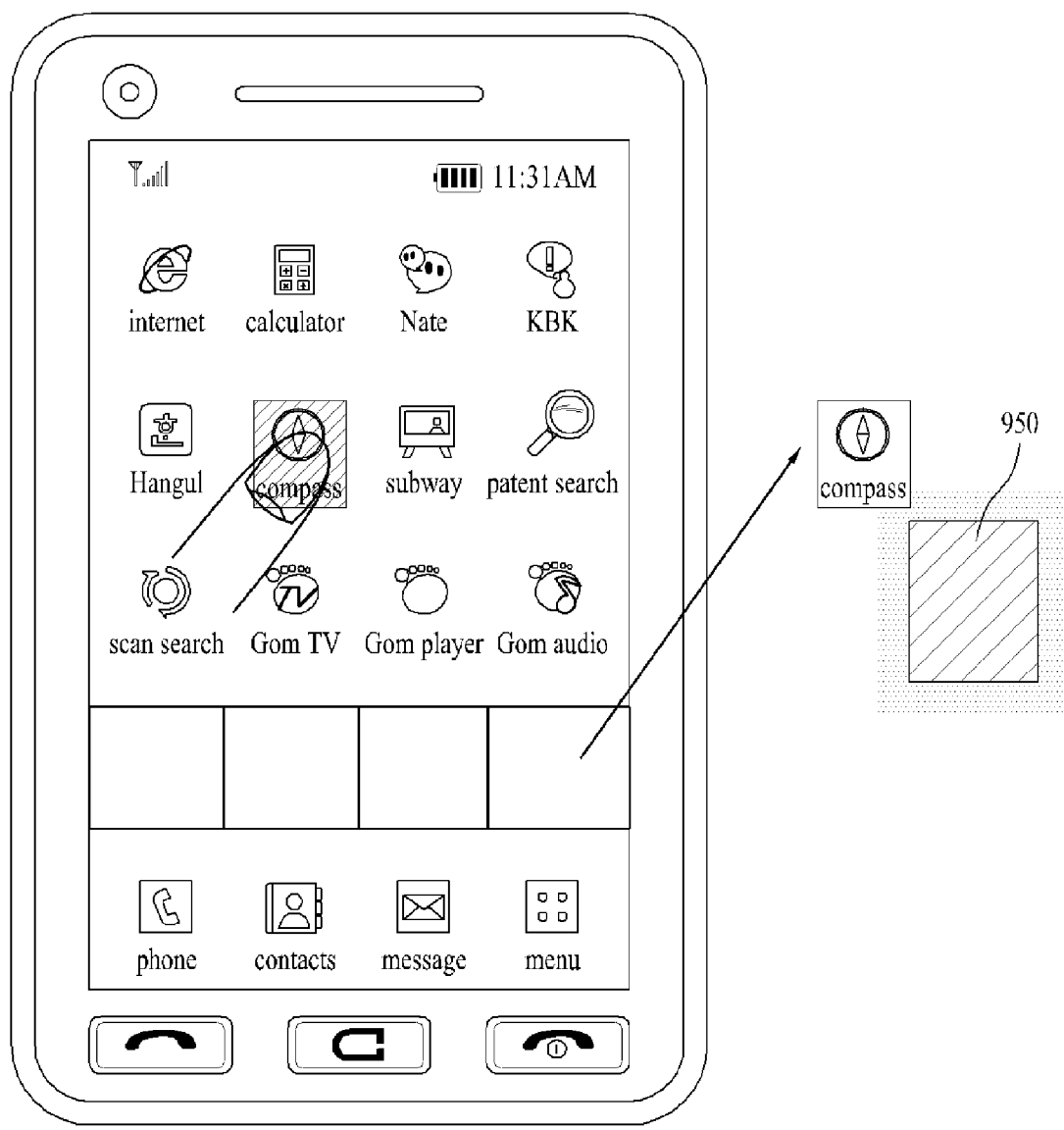

Referring to FIG. 9D, through at least one of various effects including a color, a pattern of a surface texture, a flickering, a size variation, a shape variation of at least one portion and the like of the map icon droppable region, a user can be informed of the region over which the map icon 910 can be dropped.

When a dragged icon is dropped over a droppable arrangement region in FIGS. 9B to 9D, a position of the icon is changed into the dropped arrangement region, by which the present invention is non-limited.

In particular, if a distance difference between the dragged $1^{st}$ icon and a prescribed one of a plurality of arrangement regions enters a range of a preset threshold distance, the controller 180 displays the above-mentioned visual effect on a prescribed one of the arrangement regions. While a visual effect is displayed, if a user releases a touch from the $1^{st}$ icon, a position of the $1^{st}$ icon is shifted to the visually effected prescribed arrangement region.

In this case, the threshold distance between the $1^{st}$ icon and the arrangement region is designated as a default in manufacturing the corresponding terminal or can be arbitrarily changed by a user.

For instance, as a $1^{st}$ icon enters a range of a preset threshold distance from a prescribed arrangeable region, an indicator 940 is displayed on a prescribed region, as shown in FIG. 9C. While the indicator 940 is displayed, if a user releases a touch from the $1^{st}$ icon, a position of the $1^{st}$ icon is shifted to the indicator displayed arrangement region.

Therefore, it is convenient for a user to shift an icon to a desired region by simply releasing a touch without dropping a dragged icon.

Moreover, if a $1^{st}$ icon is dragged to an arrangement region or a distance difference from the arrangement region enters a range of a threshold distance, an arrangement region including a peripheral region can be displayed by zoom-in.

In this case, the threshold distance from the arrangement region and the zoom-in region are designated as defaults in manufacturing the corresponding terminal or can be arbitrarily changed by a user.

Figure 9E:
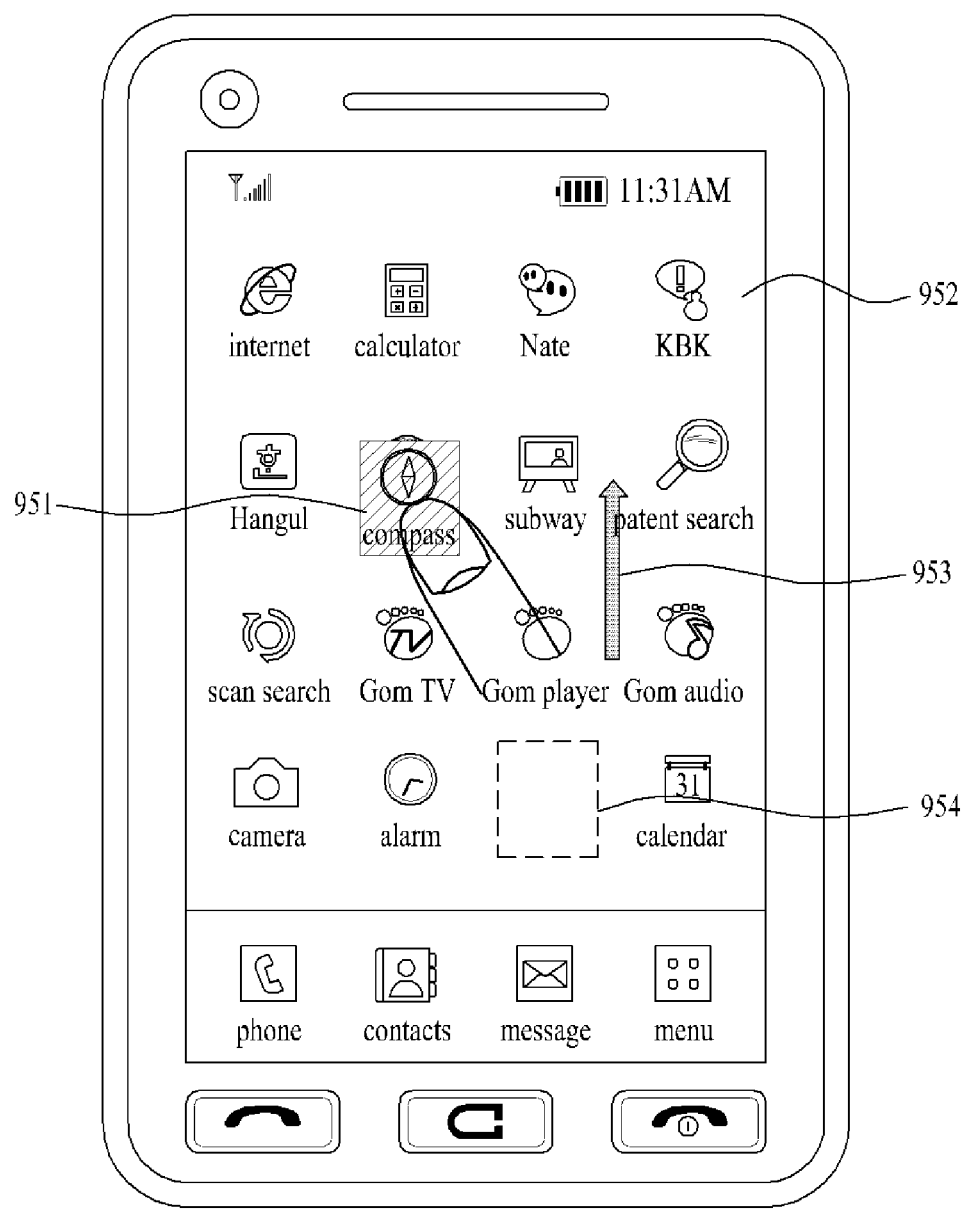
Figure 9F:
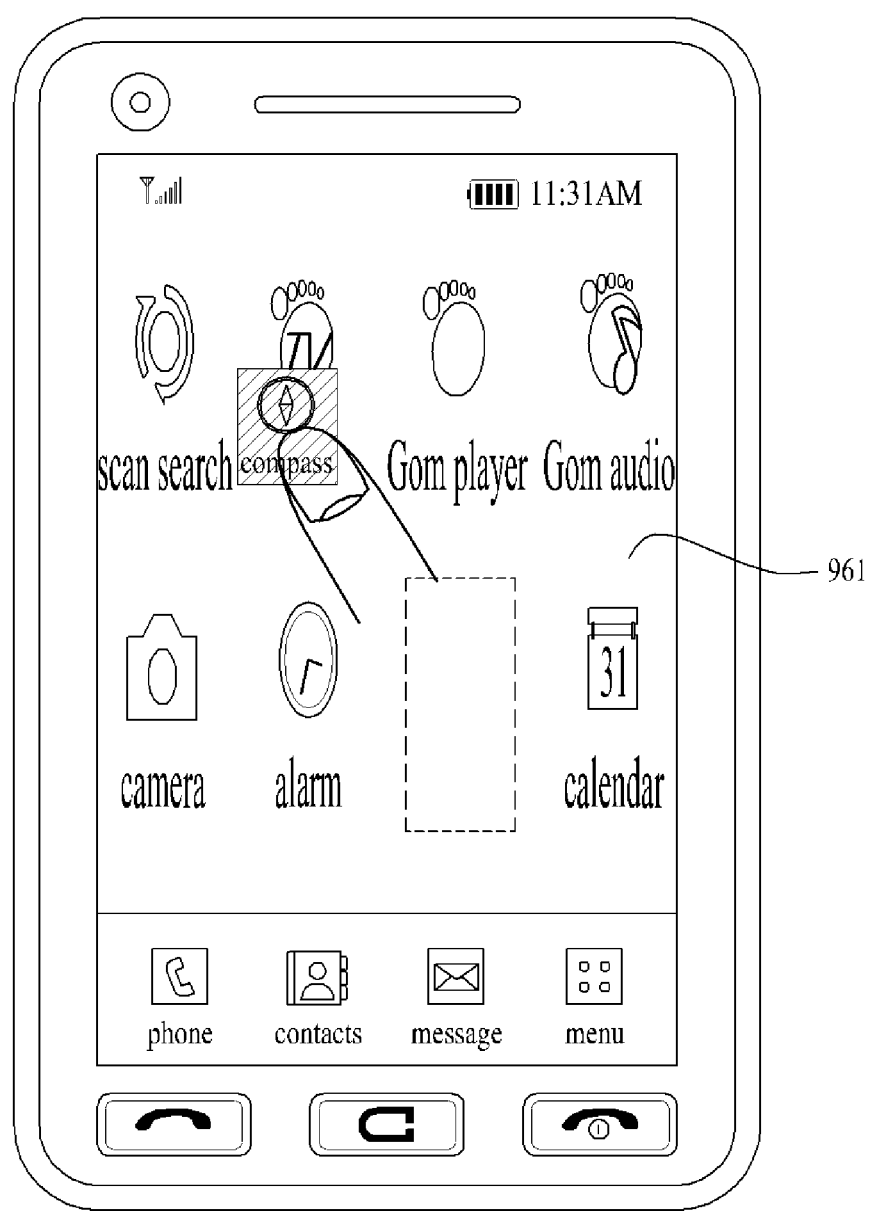

The following description is made with reference to FIG. 9E and FIG. 9F.

Referring to FIG. 9E, a distance difference from a region 954, over which a $1^{st}$ icon 951 is dragged and dropped, can enter a range of a preset threshold distance.

In this case, a droppable region and its peripheral region, as shown in FIG. 9F, can be displayed together on the display unit by zoom-in under the control of the controller 180.

Moreover, when a distance difference between a $1^{st}$ icon and an arrangement region enters a range of a threshold distance, only if a position of the $1^{st}$ icon is maintained within the threshold distance over a previously designated time, a droppable region and its peripheral region can zoom in together.

For instance, if a previously designated time is 3 seconds, a $1^{st}$ icon is dragged to enable a distance difference from an arrangement region to enter a threshold distance. Only if the dragged $1^{st}$ icon stays within the threshold distance over 3 seconds, a droppable region and its peripheral region can zoom in together.

Therefore, since the droppable region is displayed by zooming in, a user is further facilitated to shift the $1^{st}$ icon.

Meanwhile, in case that a region, over which a $1^{st}$ icon is dropped, is a region already occupied by a different icon, the problem is how to treat the $1^{st}$ icon and the different icon.

In this case, the different icon is pushed away and the $1^{st}$ icon is then arranged in the corresponding region. Alternatively, the region occupied by the different icon is divided into equal parts and a $1^{st}$ icon and a $2^{nd}$ icon are then displayed on the equal parts, respectively.

In the following description, in case that a region, over which a $1^{st}$ icon is dropped, is a region already occupied by a different icon, a method of displaying a plurality icons simultaneously in a manner of dividing the region occupied by the different icon into a plurality of equal parts according to one embodiment of the present invention is explained in detail.

For clarity and convenience of the following description, assume that a different icon overlapping with a $1^{st}$ icon shall be named a $2^{nd}$ icon.

FIG. 10 is a diagram for one example of displaying icons in case of dropping a selection icon over a different icon situated region according to one embodiment of the present invention.

Figure 10A:
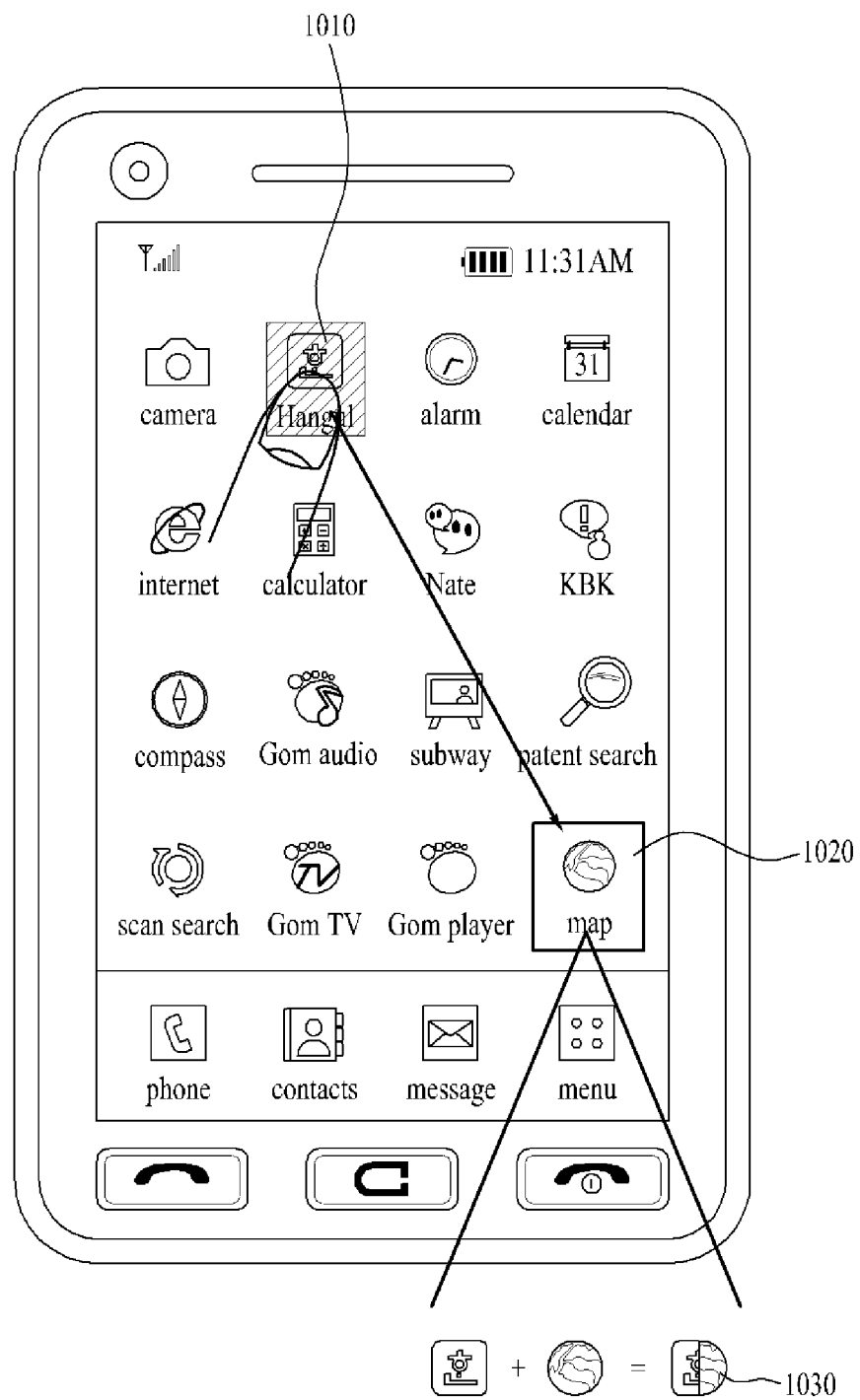
FIGS. 10A and 10B are diagrams for one example of displaying icons in case of dropping a selection icon over a different icon situated region according to one embodiment of the present invention.

Referring to FIG. 10A, a $1^{st}$ icon 101 can be dragged to a region, at which a $2^{nd}$ icon 1020 is situated, by a user.

Once the $1^{st}$ icon 1010 is dragged to the region at which the $2^{nd}$ icon 1020 is situated, the controller 180 generates a $3^{rd}$ icon 1030. In this case, the $3^{rd}$ icon 1030 is generated in a manner of dividing the $2^{nd}$ icon situated region into equal parts and then arranging the $1^{st}$ icon and the $2^{nd}$ icon on the equal parts, respectively.

Figure 10B:
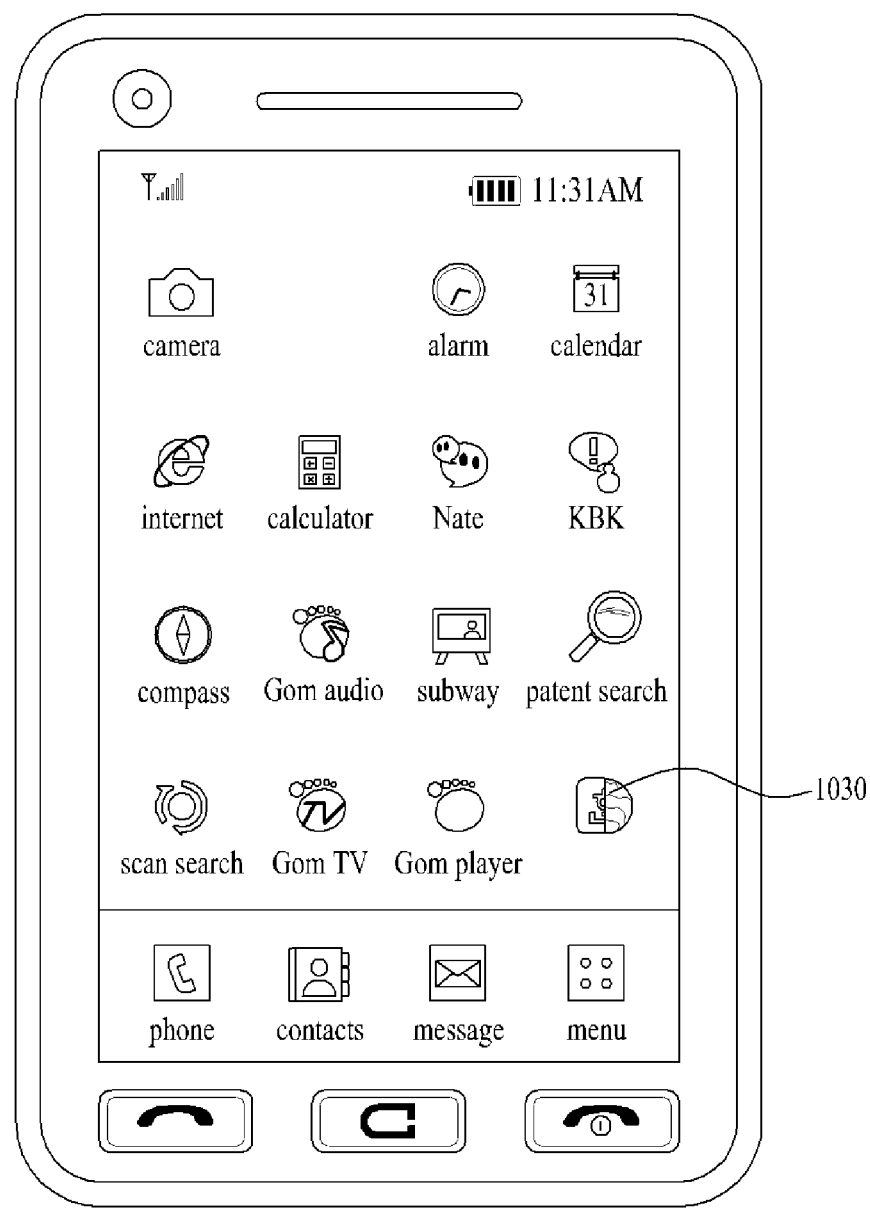

Once the $3^{rd}$ icon 1030 is generated, referring to FIG. 10B, the $3^{rd}$ icon 1030 is arranged in the region in which the $2^{nd}$ icon was arranged.

Subsequently, if a user touches to select the $3^{rd}$ icon 1030, the controller 180 is able to control applications respectively corresponding to the $1^{st}$ icon and the $2^{nd}$ icon to be simultaneously executed.

According to one embodiment of the present invention, if a $1^{st}$ icon is dropped over a region in which a folder icon is situated, it is able to provide a function of helping the $1^{st}$ icon to be arranged by enlarging the folder icon displayed region at a preset ratio.

The ratio of enlarging the folder icon displayed region is designated as a default in manufacturing the corresponding terminal or can be arbitrarily changed by a user.

The detailed description is made with reference to FIG. 11 as follows.

FIG. 11 is a diagram for one example of displaying icons in case of dropping a selected icon over a folder icon situated region according to one embodiment of the present invention.

Referring to FIG. 11, assume that a ratio of enlarging a folder icon displayed region is designated as 40% of a whole region of a touchscreen.

Figure 11A:
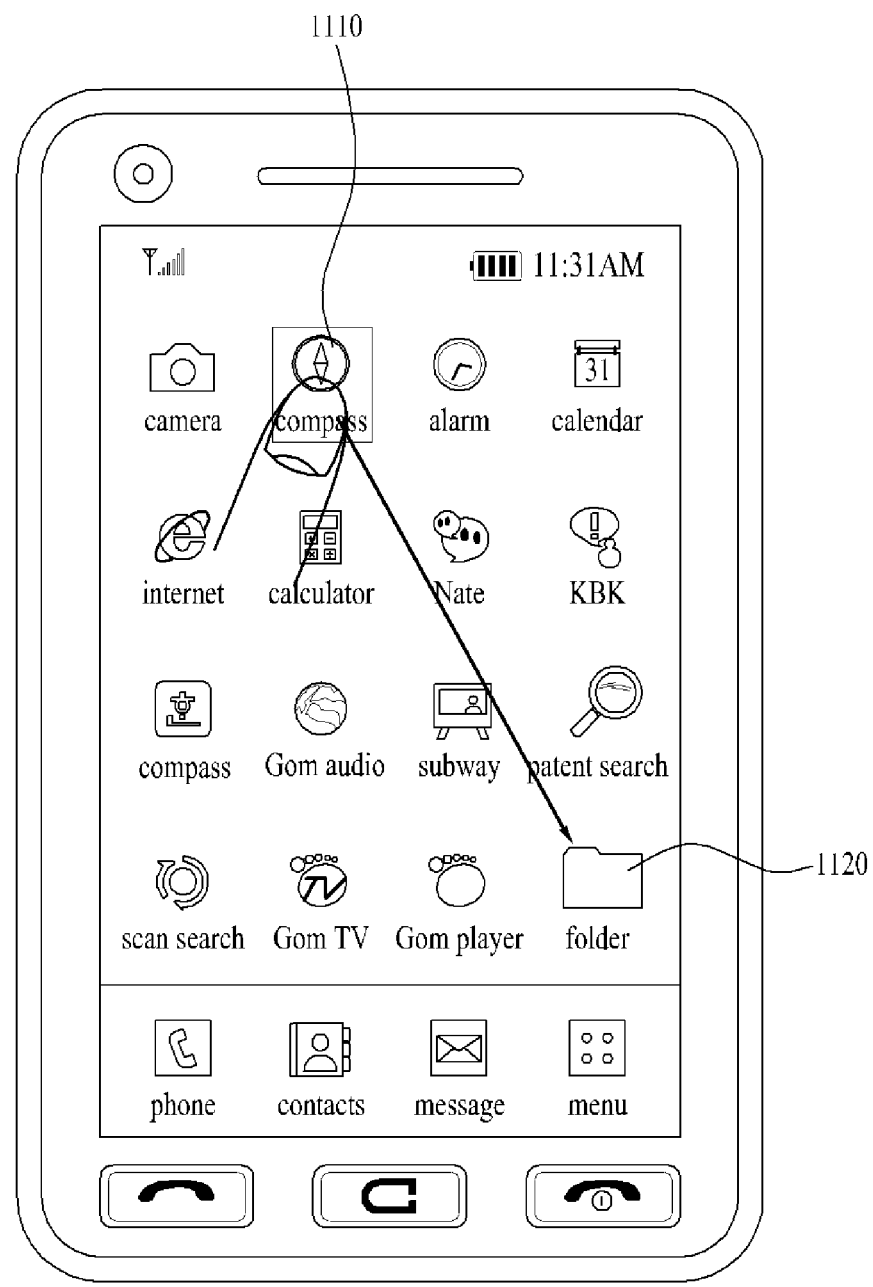
FIGS. 11A, 11B and 11C are diagrams for one example of displaying icons in case of dropping a selected icon over a folder icon situated region according to one embodiment of the present invention.

Referring to FIG. 11A, a user selects a $1^{st}$ icon 1110 and is then able to drag the selected $1^{st}$ icon 1110 to a region in which a folder icon 1120 is situated.

Figure 11B:
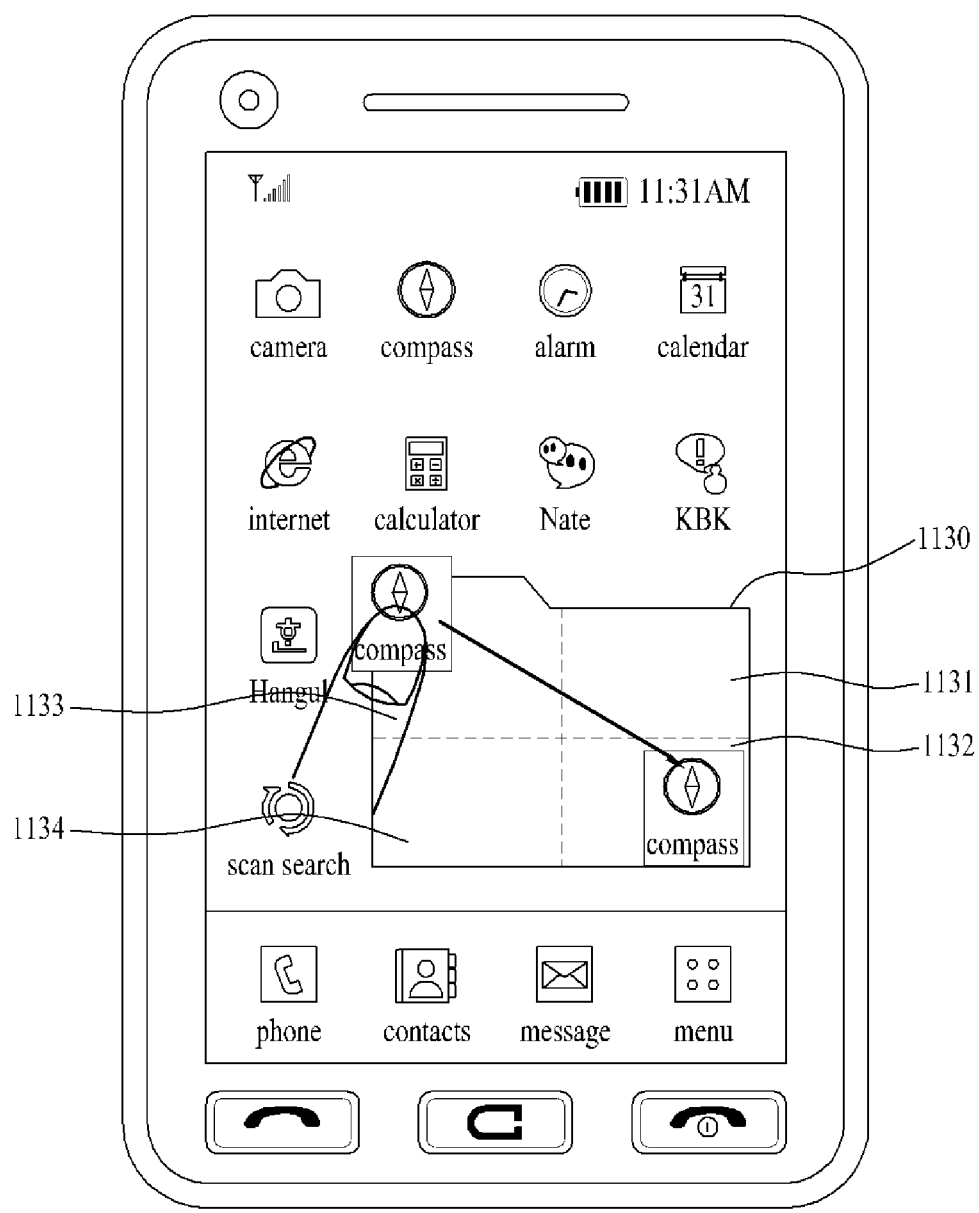

Once the $1^{st}$ icon 1110 is dragged to the folder icon situated region, referring to FIG. 11B, the controller 180 enlarges the folder icon displayed region to occupy 40% of a whole region of the touchscreen, divides an enlarged region at a prescribed ratio into a plurality of regions, in which the $1^{st}$ icon can be arranged.

In FIG. 11B, the $1^{st}$ icon displayable region in the enlarged region 1130 is divided into 4 kinds of regions 1131, 1132, 1133 and 1134.

Thereafter, a user is able to drag and drop the $1^{st}$ icon over one 1132 of the 4 kinds of the regions 1131 to 1134.

Figure 11C:
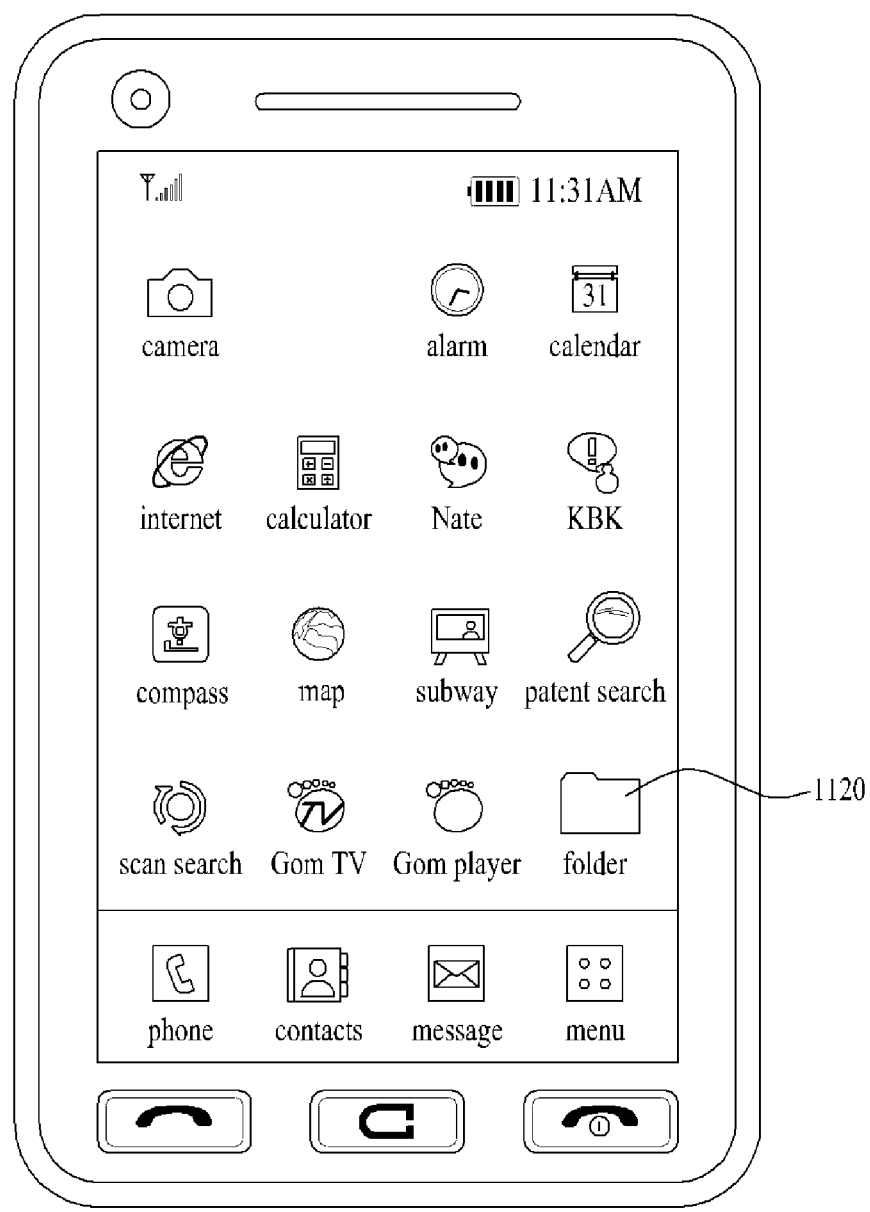

If the $1^{st}$ icon 1110 is dragged and dropped over the region 1132, referring to FIG. 11C, the $1^{st}$ icon is arranged in the dropped region. The controller 180 reduces the enlarged region at an original ratio and then displays the folder icon 1120 on the touchscreen.

According to one embodiment of the present invention, while a $1^{st}$ icon is shifted in a $1^{st}$ direction, a function of displaying the $1^{st}$ icon as a stereoscopic 3D image can be provided by a stereoscopic scheme.

In the following description, prior to the detailed description off the function of the present invention, a method of displaying a 3D image in a mobile terminal and a structure of a display unit for the same, which are applicable to embodiments of the present invention, are explained with reference to FIG. 12.

FIG. 12 is a diagram for describing a principle of binocular disparity and for one example of displaying a selected icon as a 3D stereoscopic image according to one embodiment of the present invention.

First of all, stereoscopic images implemented on the display unit 151 of the mobile terminal 100 can be mainly classified into two kinds of categories. In this case, the reference for this classification is attributed to whether different images are provided to both eyes, respectively.

The first stereoscopic image category is described as follows,

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image.

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 12A as follows.

Figure 12A:
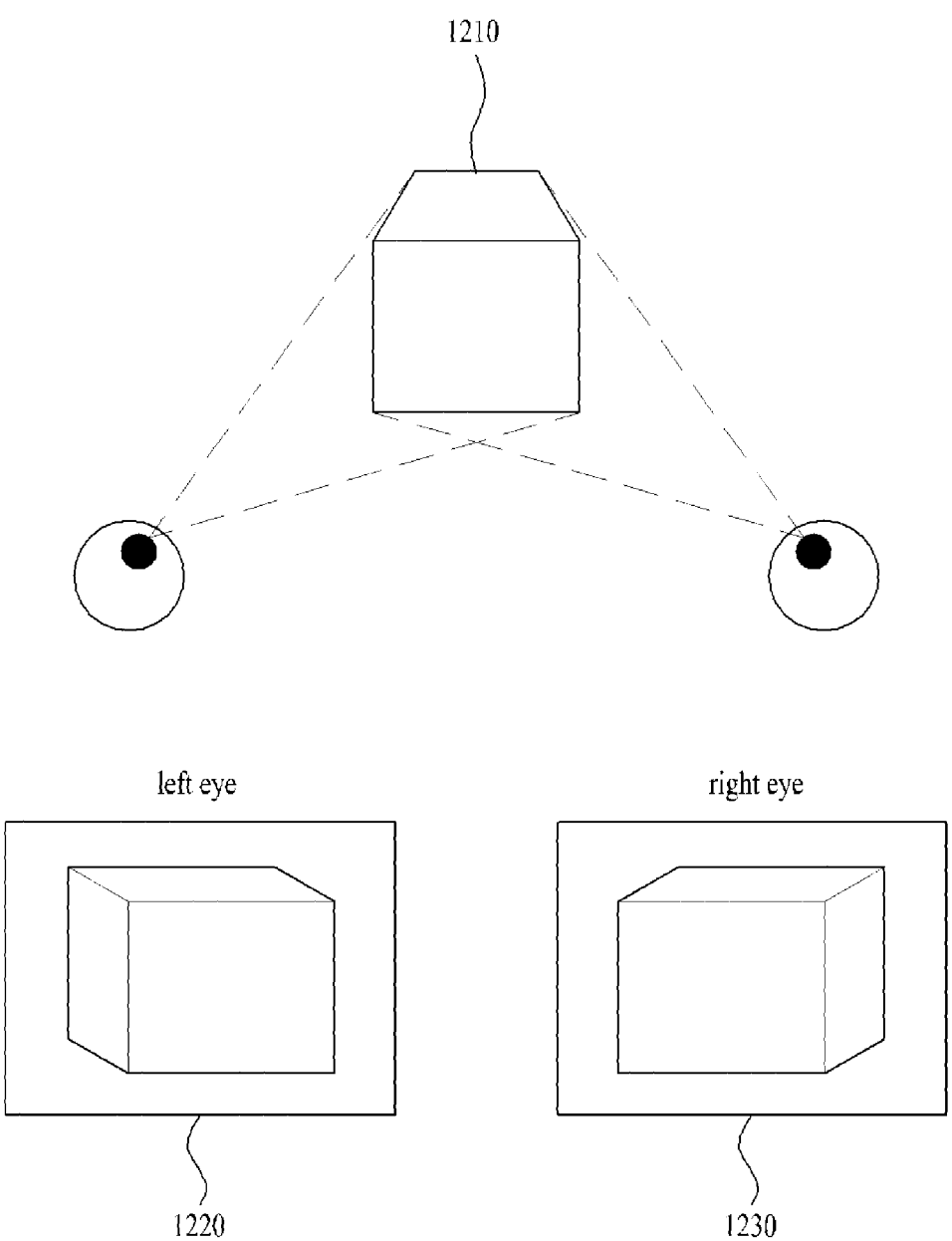
FIGS. 12A, 12B and 12C are diagrams for describing a principle of binocular disparity and for one example of displaying a selected icon as a 3D stereoscopic image according to one embodiment of the present invention.

FIG. 12A is a diagram for explaining the principle of binocular disparity.

Referring to FIG. 12, assume a situation that a hexahedron 1210 is positioned as a subject in front below an eye's height to be seen through human eyes. In this case, a left eye is able to see a left eye planar image 1220 revealing three facets including a top side, a front side and a left lateral side of the hexahedron 1210 only. And, a right eye is able to see a right eye planar image 1230 revealing three facets including the top side, the front side and a right lateral side of the hexahedron 1210 only.

Even if a real thing is not actually positioned in front of both eyes of a user, if the left eye planar image 1220 and the right eye planar image 1230 are set to arrive at the left eye and the right eye, respectively, a user is able to substantially sense the hexahedron 1210 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category shall be named '2D stereoscopic image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 12B as follows.

Figure 12B:
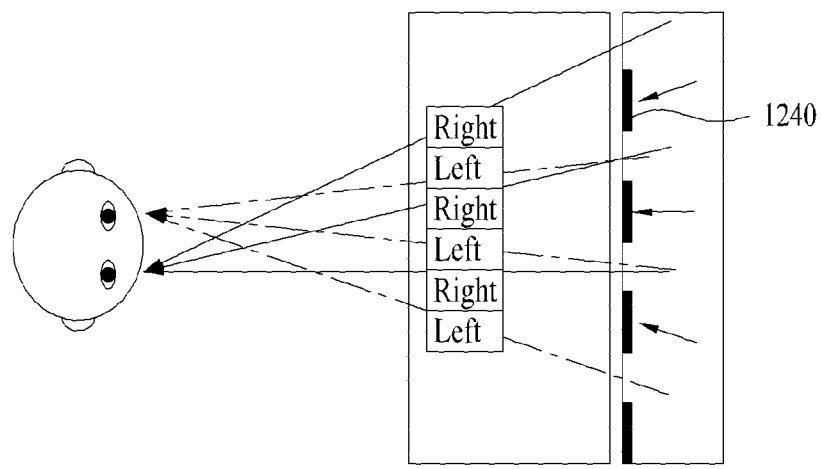
Figure 12B:
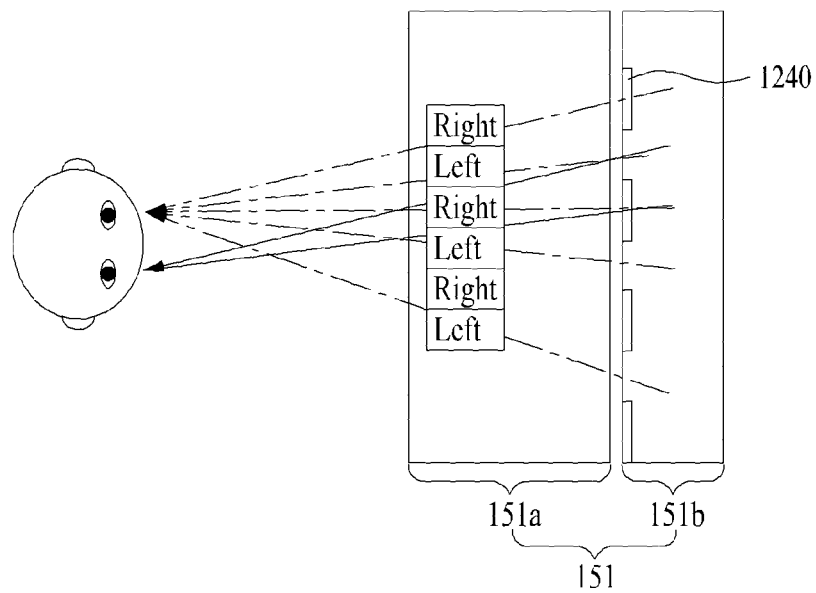

FIG. 12B is a diagram for a scheme of implementing a 3D stereoscopic image in a display unit of a parallax barrier type applicable to embodiments of the present invention.

Referring to FIG. 12B, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 1240, as shown in FIG. 12B (a), using the switch LC 151b, whereby the light is separated into two different lights to arrive at left and right eyes, respectively. Thus, when an image generated from combining an image for the right eye and an image for the left eye together is displayed on the display device 151a, a user sees the images corresponding to the eyes, respectively, thereby feeling the 3D or stereoscopic effect.

Alternatively, referring to FIG. 12B (b), the parallax barrier 1240 attributed to the switch LC is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 12B exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, referring now to the details of the present invention, a method of displaying a $1^{st}$ icon by the above-mentioned stereoscopic scheme is explained.

Figure 12C:
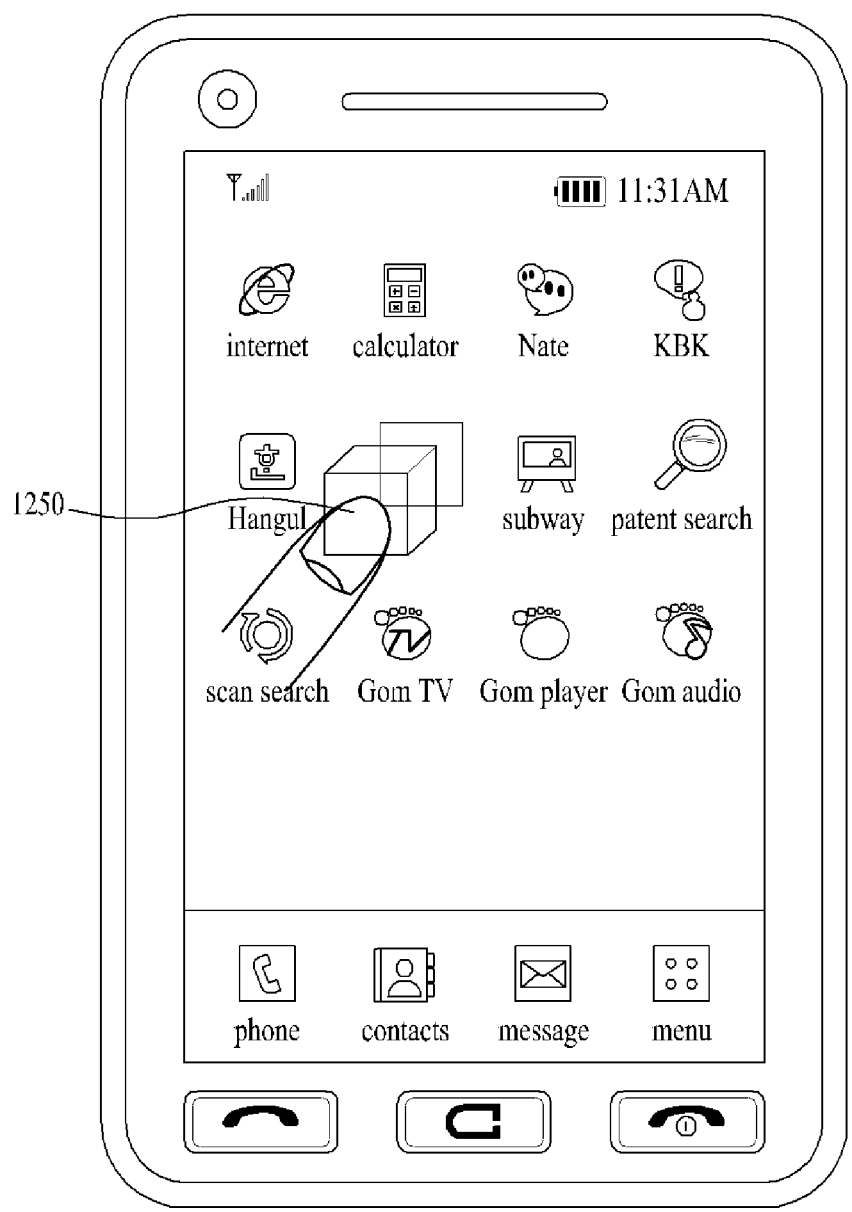

Referring to FIG. 12C, if a $1^{st}$ icon is selected and dragged by a user, the controller 180 gives a 3D depth to the $1^{st}$ icon and then provides the user with the 3D depth given $1^{st}$ icon as a 3D stereoscopic image by the stereoscopic scheme.

In this case, since the $1^{st}$ region is displayed as a 2D image, the user is able to recognize the $1^{st}$ icon is shifted in a $1^{st}$ direction visually and clearly.

Yet, displaying the $1^{st}$ region 2-dimensionally is just one example. Alternatively, the $1^{st}$ region can be displayed as a 3D stereoscopic image like the $1^{st}$ icon.

According to one embodiment of the present invention, a $1^{st}$ icon can be displayed as a 3D cube.

This is described with reference to FIG. 13 as follows.

Figure 13:
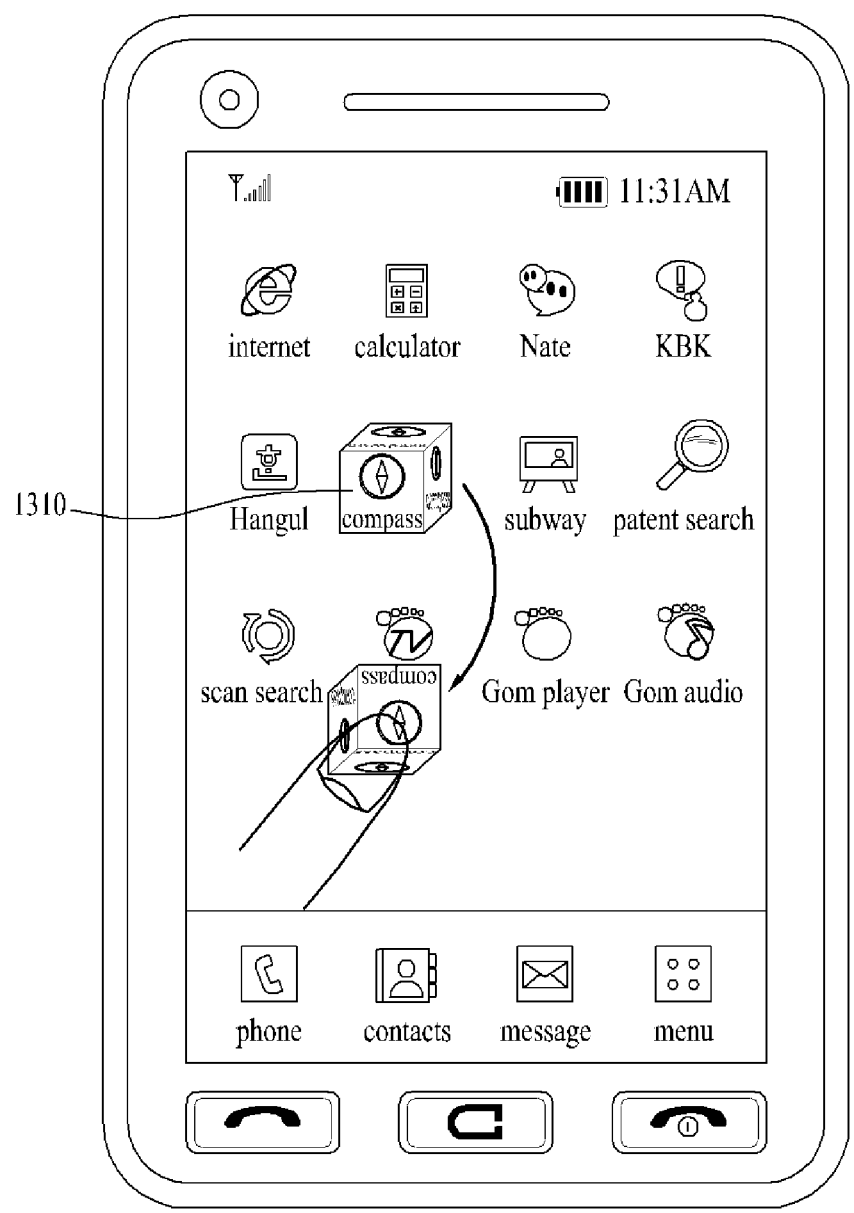
FIG. 13 is a diagram for one example of shifting a selected icon in a 3D cube form according to one embodiment of the present invention.

FIG. 13 is a diagram for one example of shifting a selected icon in a 3D cube form according to one embodiment of the present invention.

Referring to FIG. 13, a 1$^{st}$ icon is displayed as a 3D cube. If the 1$^{st}$ icon is dragged in a 1$^{st}$ direction by a user, the controller 180 is able to explicitly inform the user that the 1$^{st}$ icon is being shifted by giving the 1$^{st}$ icon an effect that the 1$^{st}$ icon is shifted by rolling.

According to one embodiment of the present invention, the features of the present invention are applicable only if a preset condition is met.

Arrangement of icons displayed on a display unit can vary in accordance with the number of icons stored in a terminal. In particular, if the number of the icons stored in the terminal is small, a size of each of the displayed icons is incremented to display a plurality of icons in less rows and columns. On the contrary, if the number of the icons stored in the terminal is big, a size of each of the displayed icons is decremented to display a plurality of icons in more rows and columns.

If a size of an icon displayed on the display unit is large, the sensing unit is able to recognize a user's touch input errorlessly. Hence, the features of the present invention may be applicable only if a plurality of icons are displayed in more rows and columns with small size.

This is described in detail with reference to FIG. 14 as follows.

FIG. 14 is a diagram for one example of shifting an icon displayed region in an opposite direction, if a preset condition is met and a selected icon is dragged, according to one embodiment of the present invention.

Figure 14A:
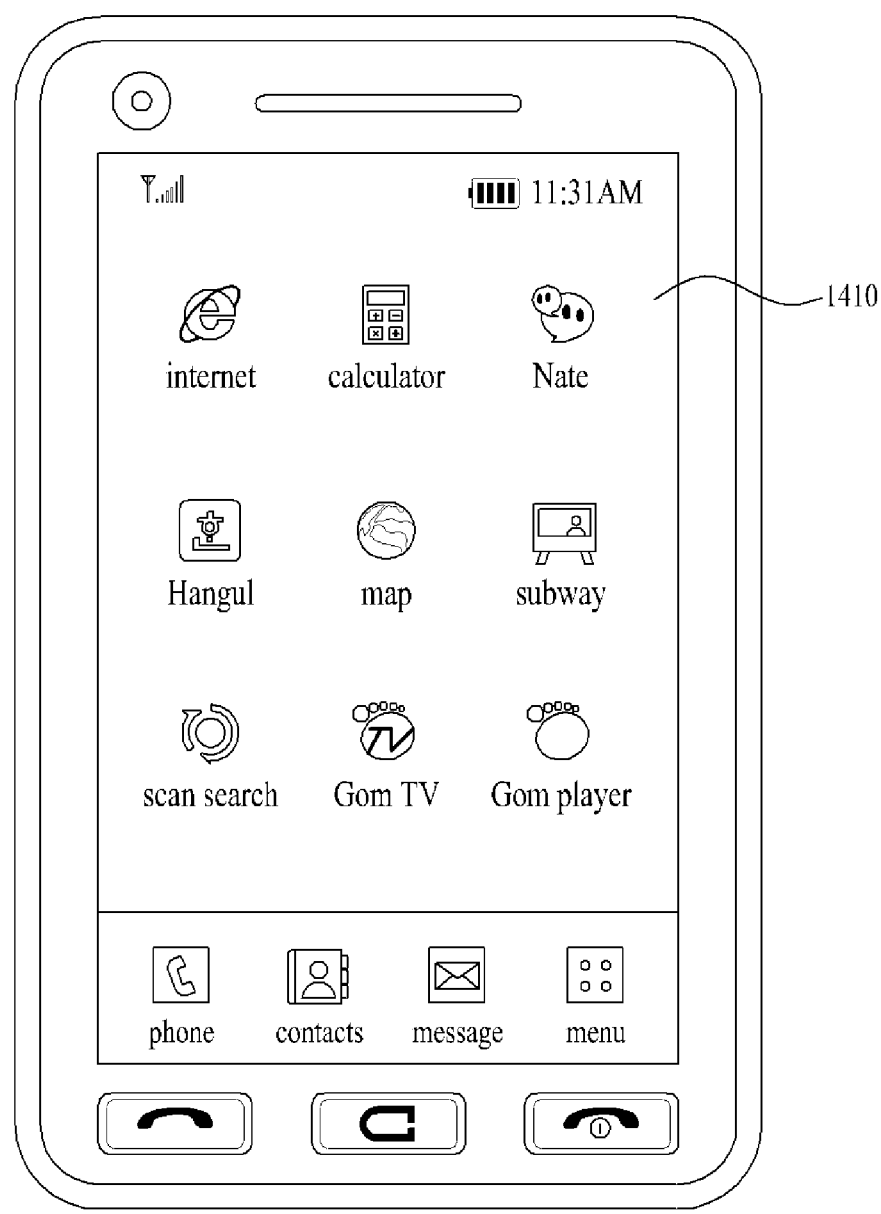
FIGS. 14A, 14B and 14C are diagrams for one example of shifting an icon displayed region in an opposite direction, if a preset condition is met and a selected icon is dragged, according to one embodiment of the present invention.

Referring to FIG. 14A, a size of each icon is increased. And, a plurality of icons are displayed in less rows and columns.

In doing so, a plurality of the icons 1410 are displayed on the display unit using 3 rows and 3 columns.

Figure 14B:
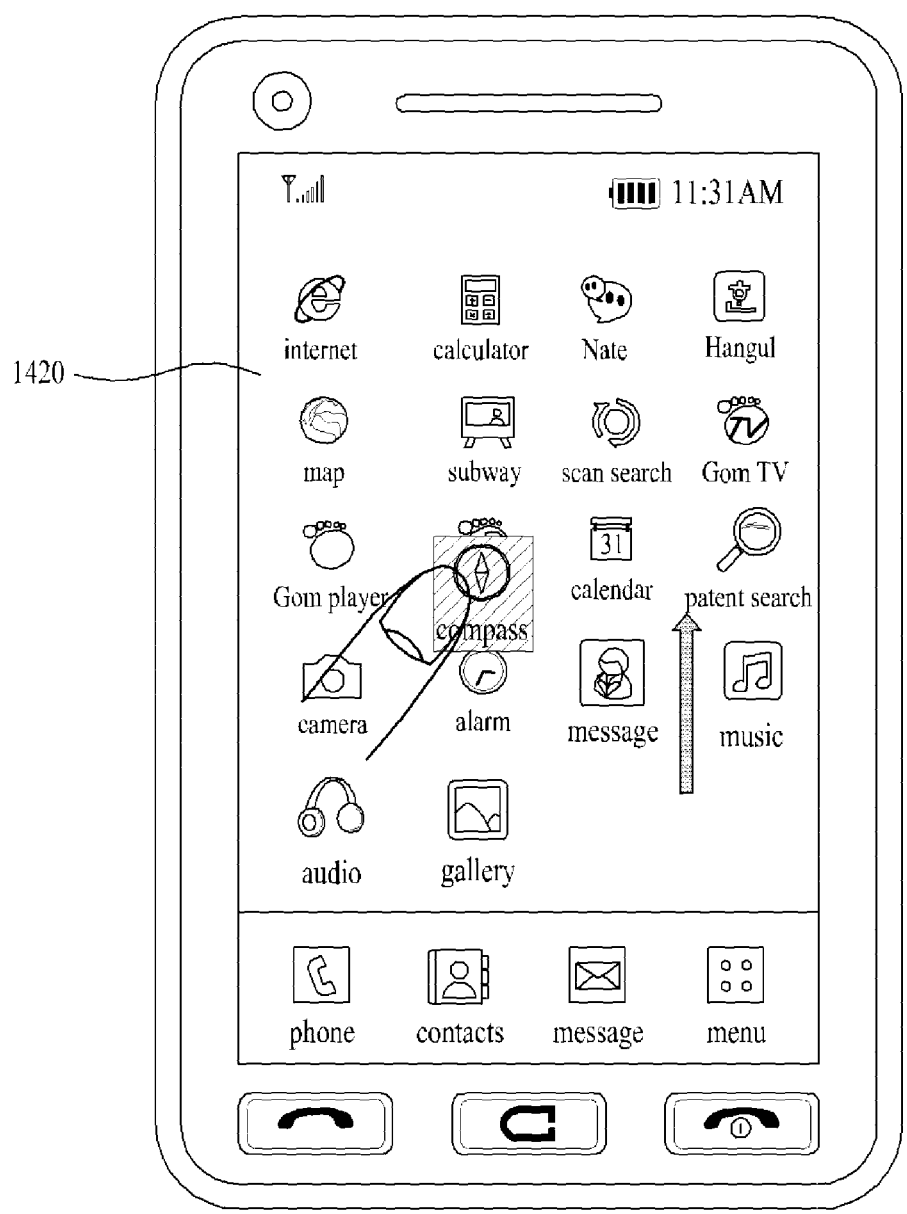

In particular, referring to FIG. 14B, arrangement of the displayed icons can be changed in accordance with a user's menu manipulation or a preset touch input.

In more particular, referring to FIG. 14B, a size of each icon is decreased. And, a plurality of icons are displayed in more rows and columns.

FIG. 14B shows that a plurality of icons are displayed in 5 rows and 4 columns. Unlike FIG. 14A, FIG. 14B shows that a distance between icons is short due to high density. If the features of the present invention are applied, the effect can be maximized.

In particular, if a 1$^{st}$ icon is shifted by being dragged, an icon displayed region can be shifted in an opposite direction.

In doing so, in order to inform a user that the features of the present invention are applied, a prescribed effect (e.g., indicator, etc.) can be displayed on a prescribed region of the display unit.

Figure 14C:
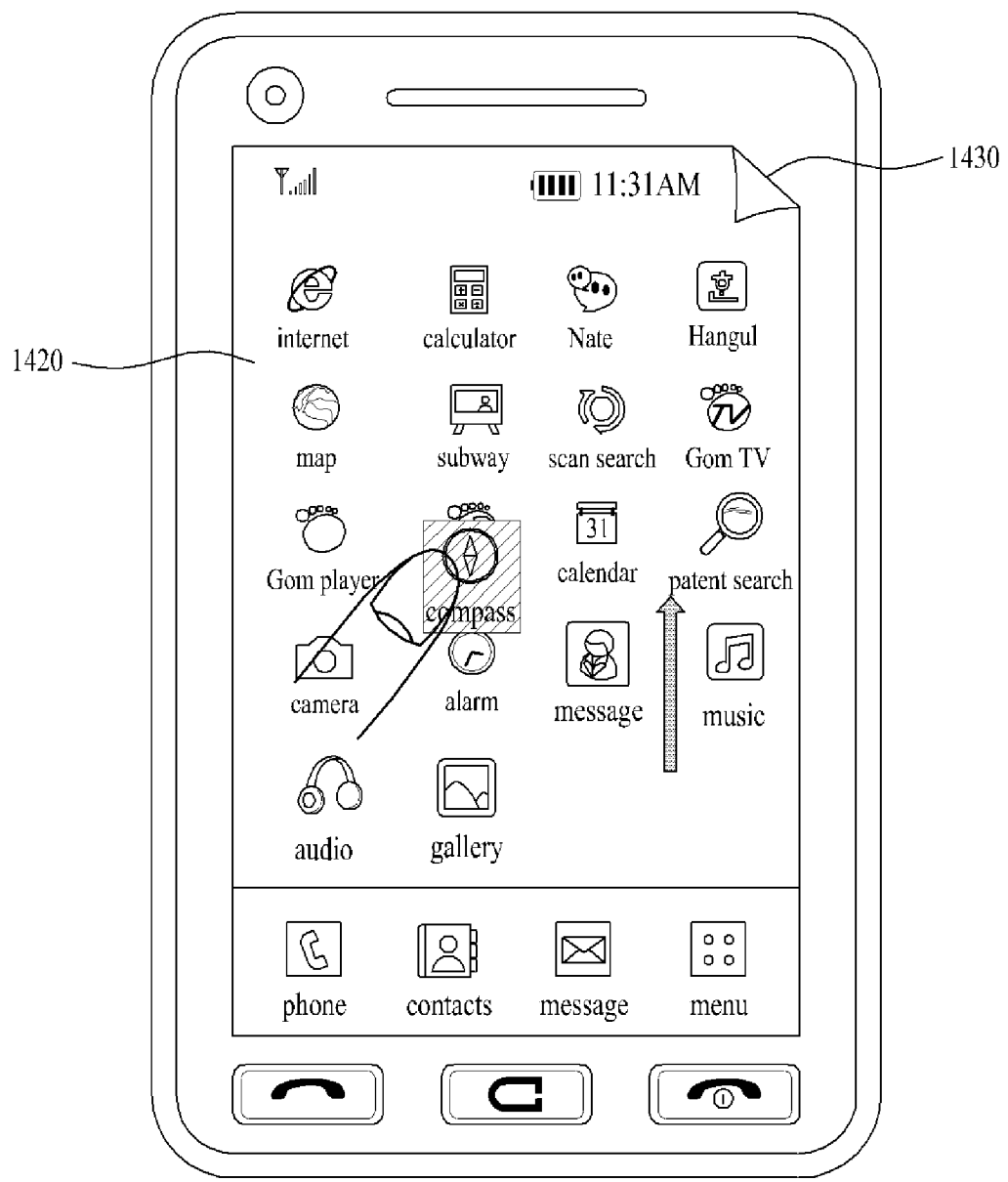

Referring to FIG. 14C, an indicator 1430 is displayed on a right top side of the displayed unit, whereby a user can be informed that the features of the present invention (i.e., an icon displayed region is being shifted in an opposite direction) are currently applied.

Moreover, the preset condition can be implemented in various ways.

For instance, only if such an event as a case that a size of a user's finger, a stylus pen or the like is greater than a size designated to a terminal (e.g., a finger or stylus pen size required for recognizing a user's touch input), a case that a user fails in shifting a 1$^{st}$ icon several times, and the like, the contents of the present invention will be applicable.

In the above example, if the contents of the present invention are applied due to an event occurrence, a prescribed effect (e.g., indicator, etc.) can be displayed on a prescribed region of the display unit to inform a user that the contents of the present invention are being applied.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal including the stereoscopic image displayable display unit are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to display a first region that comprises a first icon and one or more second icons; and
a controller configured to control the touchscreen to:
shift the first region in a first direction and move the first icon in a second direction opposite to the first direction when the first icon is selected by a touch and dragged in the second direction,
display the first icon as a three-dimensional (3D) image when the first icon is selected and display the 3D image of the first icon to appear to roll in the second direction while the first icon is dragged;
display an additional region adjacent to the first region when the first region is shifted in the first direction, wherein a height of the additional region corresponds to a length in which the first region was shifted;
shift a position of the first icon to the additional region when the dragged first icon is released over the additional region,
display the first icon as a two-dimensional (2D) image when the first icon is released over the additional region; and
arrange the one or more second icons of the first region according to a prescribed formation,
wherein:
the additional region includes at least one empty row of arrangeable sub-regions or at least one empty column of arrangeable sub-regions, and each arrangeable sub-region is configured for positioning the first icon.

2. The mobile terminal of claim 1, wherein the controller is further configured to control the touchscreen to:
shift the first region at a speed that corresponds to a dragged speed of the first icon.

3. The mobile terminal of claim 1, wherein the controller is further configured to:
identify a specific coordinate direction of a plurality of coordinate directions, the specific coordinate direction having a highest directional similarity to the first direction among the plurality of coordinate directions; and
set the second direction to a coordinate direction opposite the specific coordinate direction.

4. The mobile terminal of claim 1, wherein the controller is further configured to control the touchscreen to:
 display the first icon as tilted at an angle in accordance with the second direction.

5. The mobile terminal of claim 1, wherein the controller is further configured to control the touchscreen to:
 display a visual effect indicating the shift of the first region in the first direction.

6. The mobile terminal of claim 1, wherein the controller is further configured to control the touchscreen to:
 display a visual effect for each of a plurality of arrangeable sub-regions when the first icon is released over the plurality of arrangeable sub-regions.

7. The mobile terminal of claim 6, wherein the controller is further configured to control the touchscreen to:
 display an indicator indicating that the first icon is shiftable to a first arrangeable sub-region of the plurality of arrangeable sub-regions when a distance between the first icon being dragged and the first arrangeable sub-region is less than a preset threshold distance, and
 shift the position of the first icon to the first arrangeable sub-region when the first icon being dragged is released.

8. The mobile terminal of claim 1, wherein the controller is further configured to control the touchscreen to:
 partition the additional region into equal parts when the first icon is released in the additional region, wherein the additional region comprises a third icon,
 display the additional region as a grid comprising the equal parts, and
 display the first icon on one of the equal parts and the third icon on another of the equal parts.

9. The mobile terminal of claim 8, wherein the controller is further configured to:
 simultaneously execute applications corresponding to the first icon and the third icon when the third icon is selected.

10. The mobile terminal of claim 1, wherein:
 the controller is further configured to:
  control the touchscreen to display an enlarged folder icon with a plurality of arrangeable sub-regions when the first icon is released over a region with a folder icon, wherein the folder icon is enlarged at a preset ratio and the enlarged folder is partitioned into the plurality of arrangeable sub-regions using a preset ratio,
  position the first icon in an arrangeable sub-region of the plurality of arrangeable sub-regions where the first icon was released, wherein the first icon is arrangeable in each of the plurality of arrangeable sub-regions, and
  control the touchscreen to reduce a size of the enlarged folder icon to its original size when the first icon is released in the arrangeable sub-region.

11. The mobile terminal of claim 1, wherein the additional region is displayed at a prescribed ratio of a display area of the touchscreen when the first icon is dragged over the additional region.

12. The mobile terminal of claim 11, wherein the controller is further configured to control the touchscreen to:
 display the additional region at the prescribed ratio when a distance between the first icon being dragged and a first arrangeable sub-region of the plurality of arrangeable sub-regions is at least a threshold distance and the dragged first icon remains within a range of the threshold distance for a threshold time period.

13. The mobile terminal of claim 1, wherein the controller is further configured to control the touchscreen to:
 shift the first region in the first direction when the one or more second icons of the first region are arranged in at least a preset number of rows and columns of adjacent icons.

14. The mobile terminal of claim 1, wherein the controller is further configured to control the touchscreen to:
 shift the first region in the first direction when:
  a count of failed attempts to drag and release the first icon over the additional region exceeds a threshold number, or
  a size of a pointer performing at least a touch, a proximity touch, or a gesture on the touchscreen is equal to or greater than a threshold size.

15. The mobile terminal of claim 14, wherein the controller is further configured to control the touchscreen to:
 display a visual effect indicating that the first region is shifted in the first direction.

16. The mobile terminal of claim 1, wherein the controller is further configured to control the touchscreen to:
 change a propagation direction of the first icon; and display the first icon as a three-dimensional stereoscopic image using a stereoscopic scheme.

17. The mobile terminal of claim 1, wherein the controller is further configured to:
 control the touchscreen to display a combined icon comprising at least a portion of the first icon and at least a portion of a third icon when the first icon is released at a sub-region comprising the third icon, and
 execute a first application corresponding to the first icon and a second application corresponding to the third icon in response to an input selecting the displayed combined icon.

18. A method of controlling a mobile terminal, the method comprising:
 displaying a first region comprising a first icon and one or more second icons;
 moving the first icon selected from the first region in a first direction in response to an input selecting and dragging the first icon in the first direction;
 shifting the one or more second icons in a second direction, wherein the second direction is opposite to the first direction;
 displaying the first icon as a three-dimensional (3D) image when the first icon is selected and displaying the 3D image of the first icon to appear to roll in the first direction while the first icon is dragged;
 displaying an additional region adjacent to the first region when the one or more second icons are shifted in the second direction, wherein a height of the additional region corresponds to a length in which the one or more second icons were shifted;
 shifting a position of the first icon to a position in the additional region when the first icon is released over the additional region;
 displaying the first icon as a two-dimensional (2D) image when the first icon is released over the additional region; and
 arranging the one or more second icons of the first region according to a prescribed formation,
 wherein the additional region includes at least one empty row of arrangeable sub-regions or at least one empty column of arrangeable sub-regions, and wherein each arrangeable sub-region is configured for positioning the first icon.

19. The method of claim 18, the method further comprising:

shifting the first region at a speed that corresponds to a dragged speed of the first icon.

20. The method of claim 18, further comprising:

identifying a specific coordinate direction of a plurality of coordinate directions, the specific coordinate direction having a highest directional similarity to the first direction among the plurality of coordinate directions; and setting the second direction to a coordinate direction opposite the specific coordinate direction.

21. The method of claim 18, the method further comprising:

partitioning the additional region into equal parts when the first icon is released in the additional region, wherein the additional region comprises a third icon, displaying the additional region as a grid comprising the equal parts, and displaying the first icon on one of the equal parts and a third icon on another of the equal parts.

22. The method of claim 18, further comprising:

displaying a combined icon comprising at least a portion of the first icon and at least a portion of a third icon when the first icon is released at a sub-region comprising the third icon, and executing a first application corresponding to the first icon and a second application corresponding to the third icon in response to an input selecting the displayed combined icon.

* * * * *